April 4, 1939.  J. W. BRYCE ET AL  2,153,167

TABULATING MACHINE

Filed Feb. 21, 1930  22 Sheets-Sheet 1

Inventor
James W. Bryce
George F. Daly
By their Attorney
W. M. Wilson

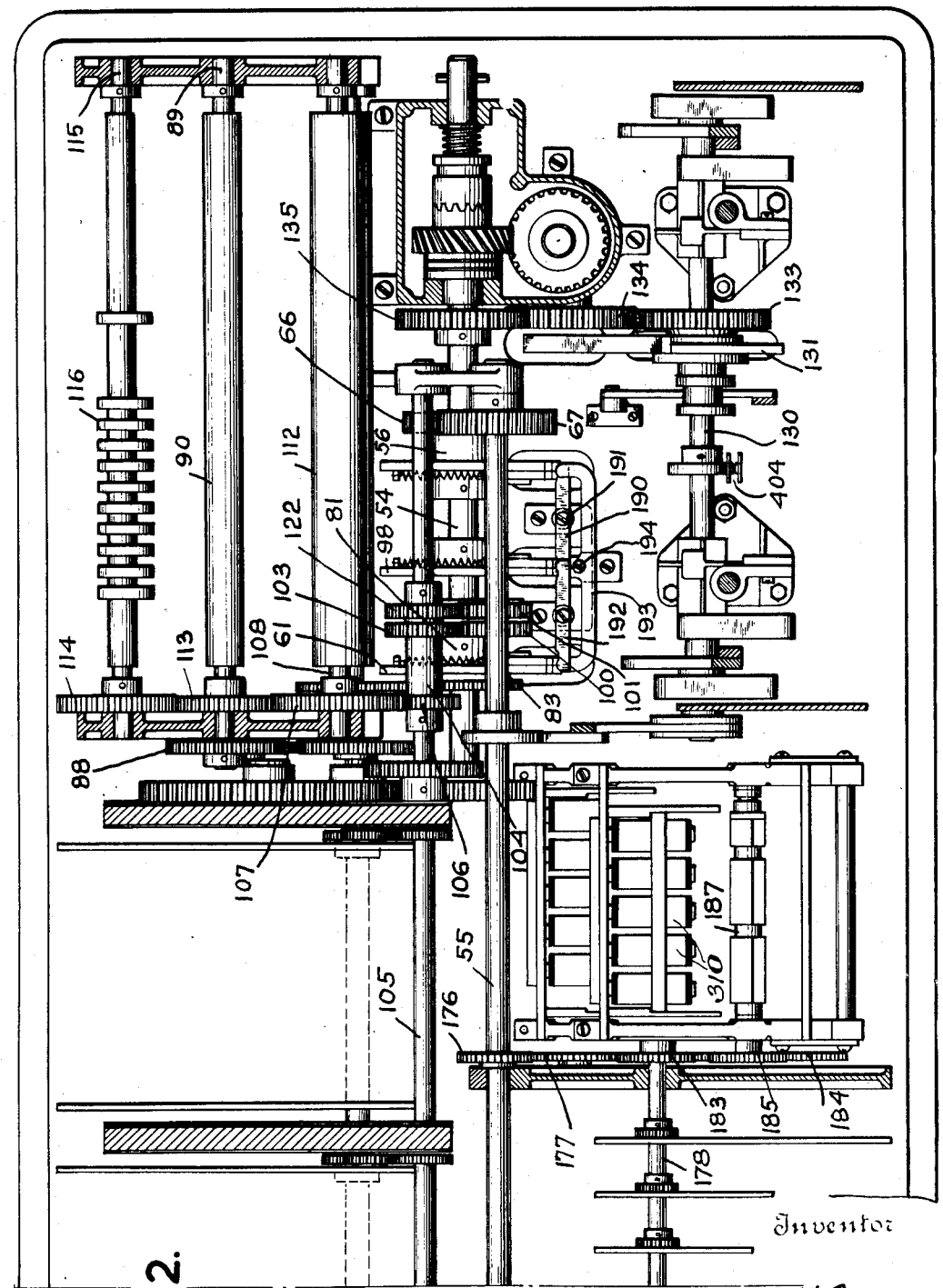

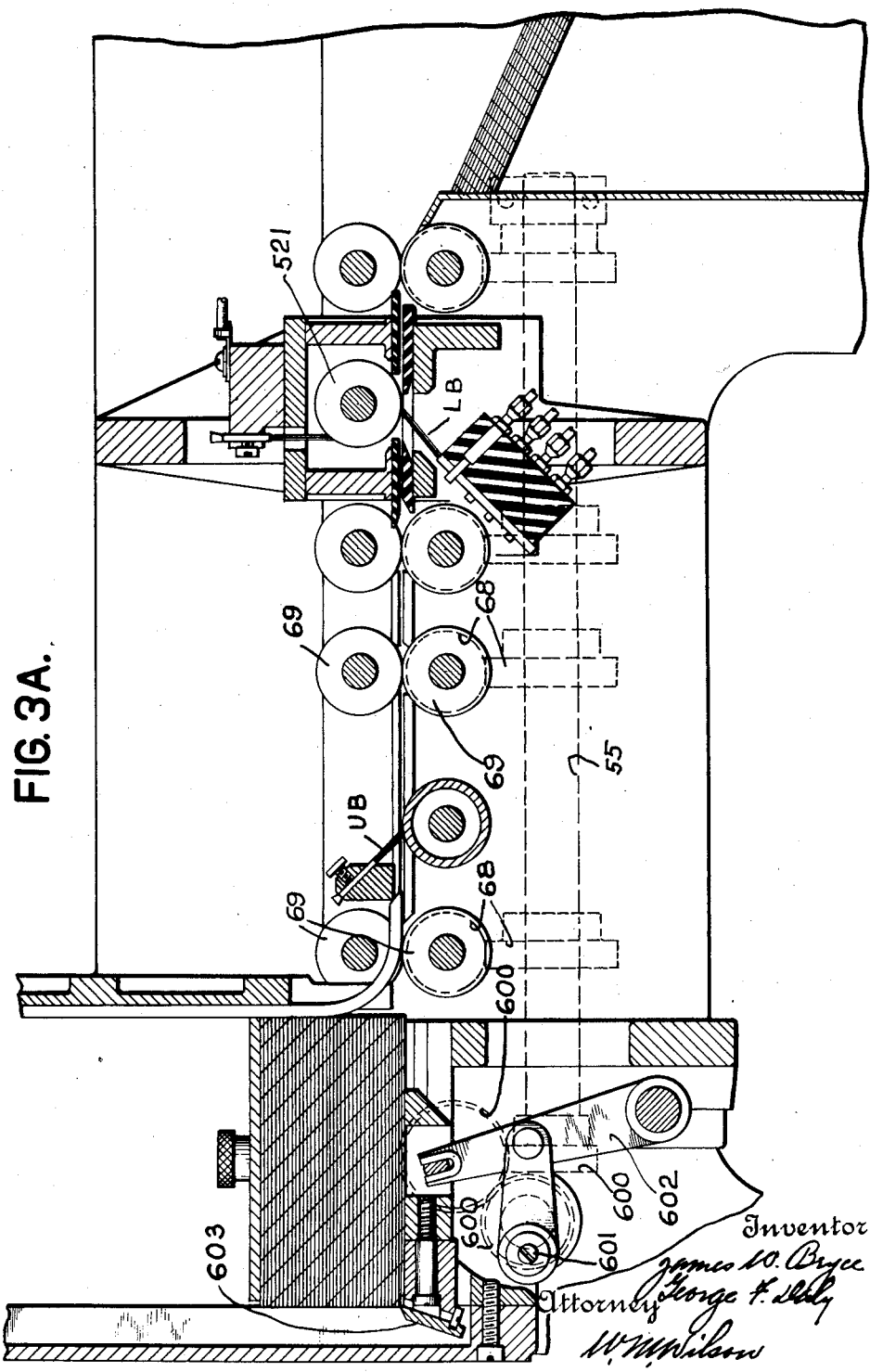

April 4, 1939.　　　J. W. BRYCE ET AL　　　2,153,167
TABULATING MACHINE
Filed Feb. 21, 1930　　　22 Sheets-Sheet 5

Inventor
James W. Bryce
George F. Daly
By their Attorney
W. M. Wilson

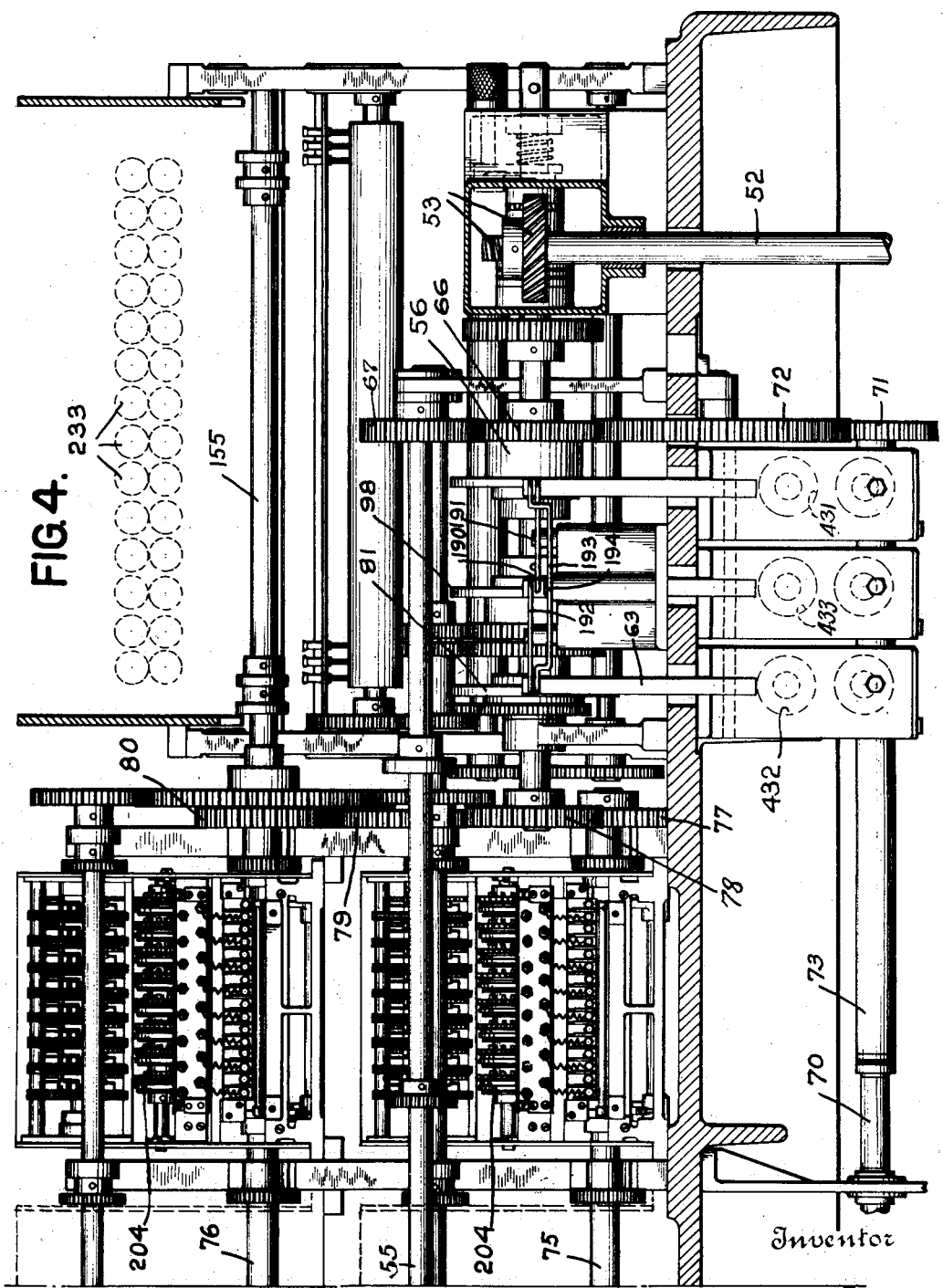

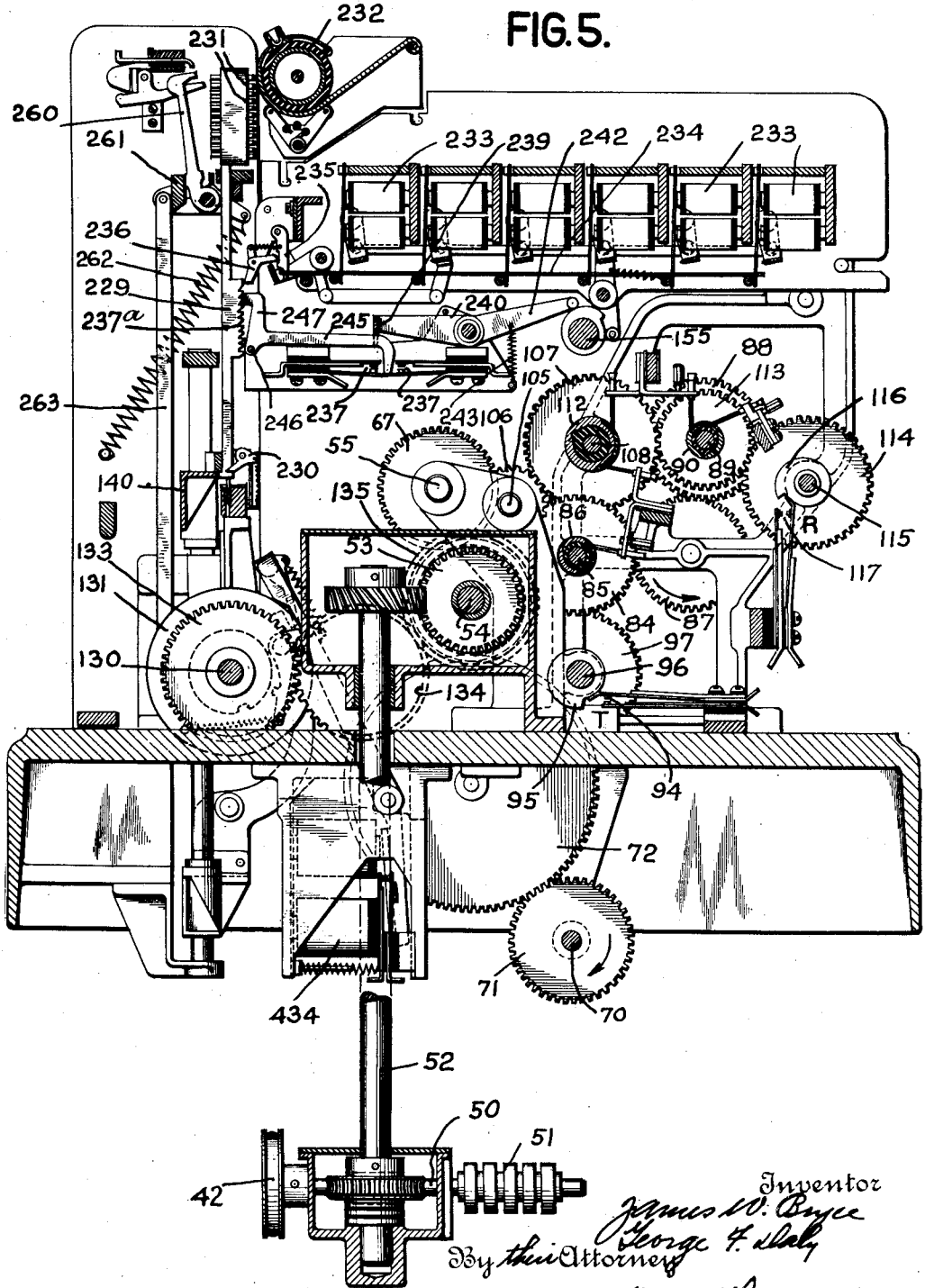

April 4, 1939.　　　J. W. BRYCE ET AL　　　2,153,167
TABULATING MACHINE
Filed Feb. 21, 1930　　　22 Sheets-Sheet 8

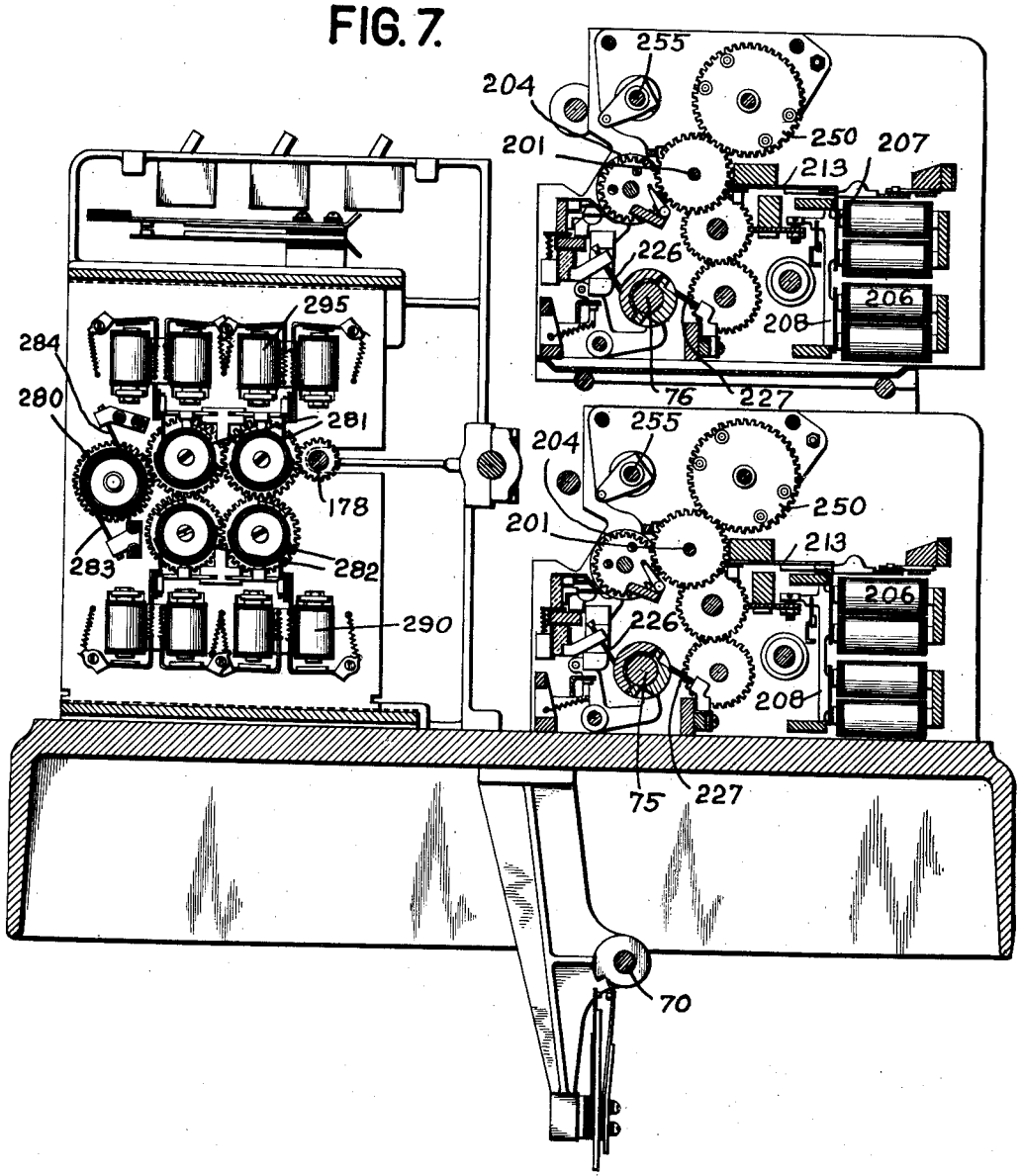

April 4, 1939.　　　J. W. BRYCE ET AL　　　2,153,167
TABULATING MACHINE
Filed Feb. 21, 1930　　　22 Sheets-Sheet 10

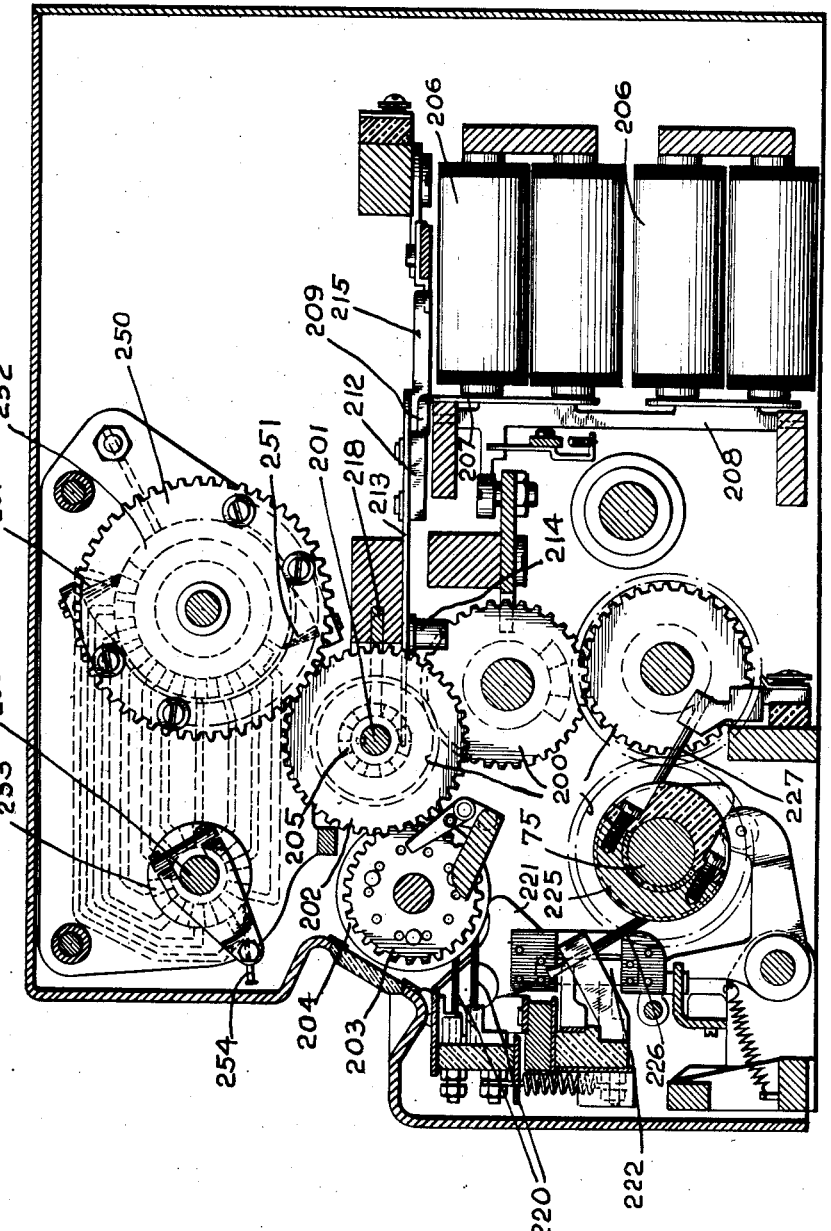

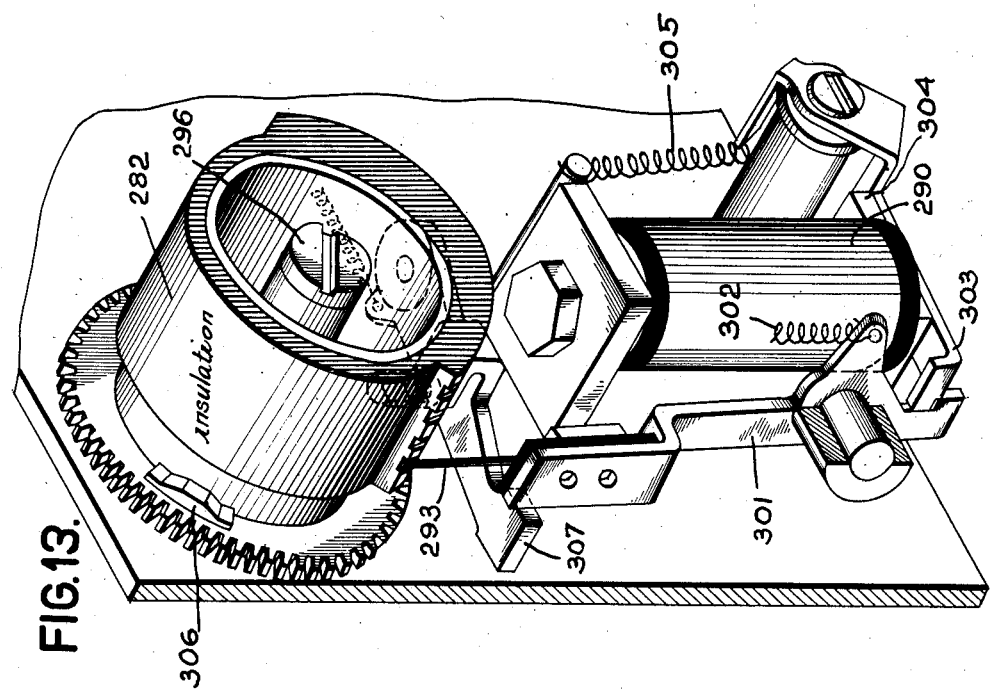
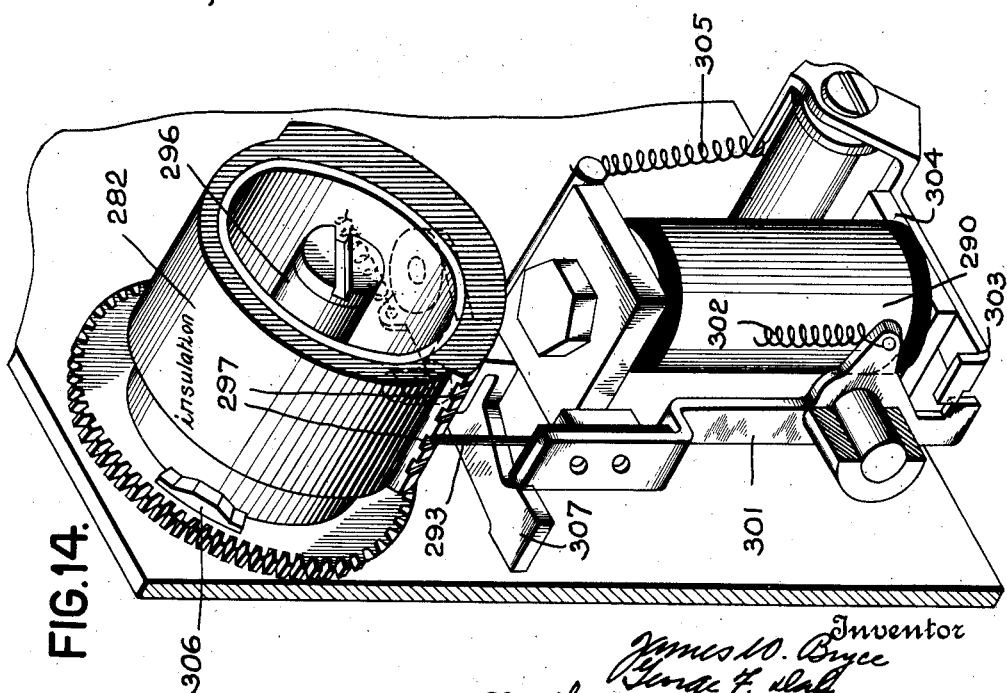

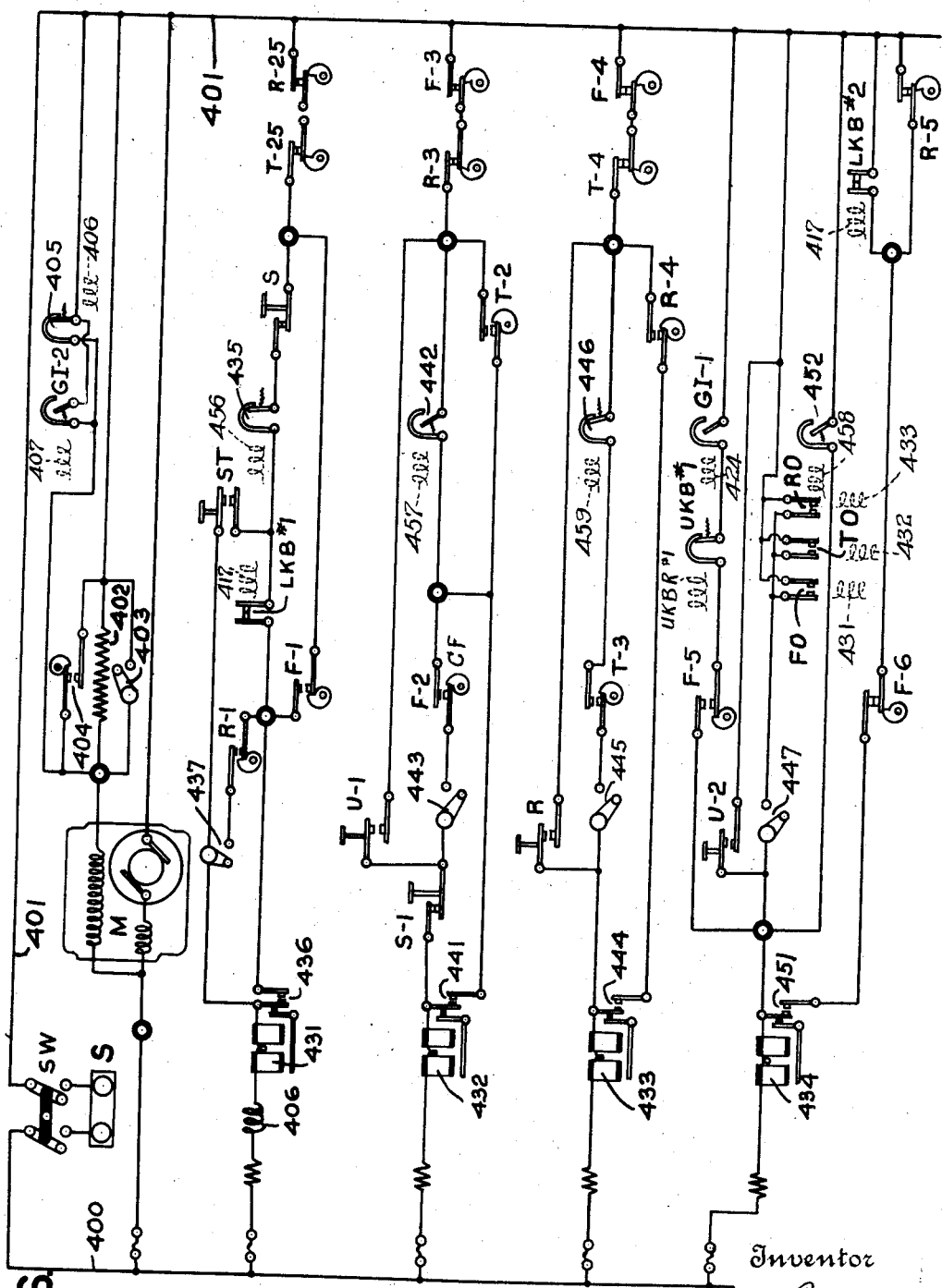

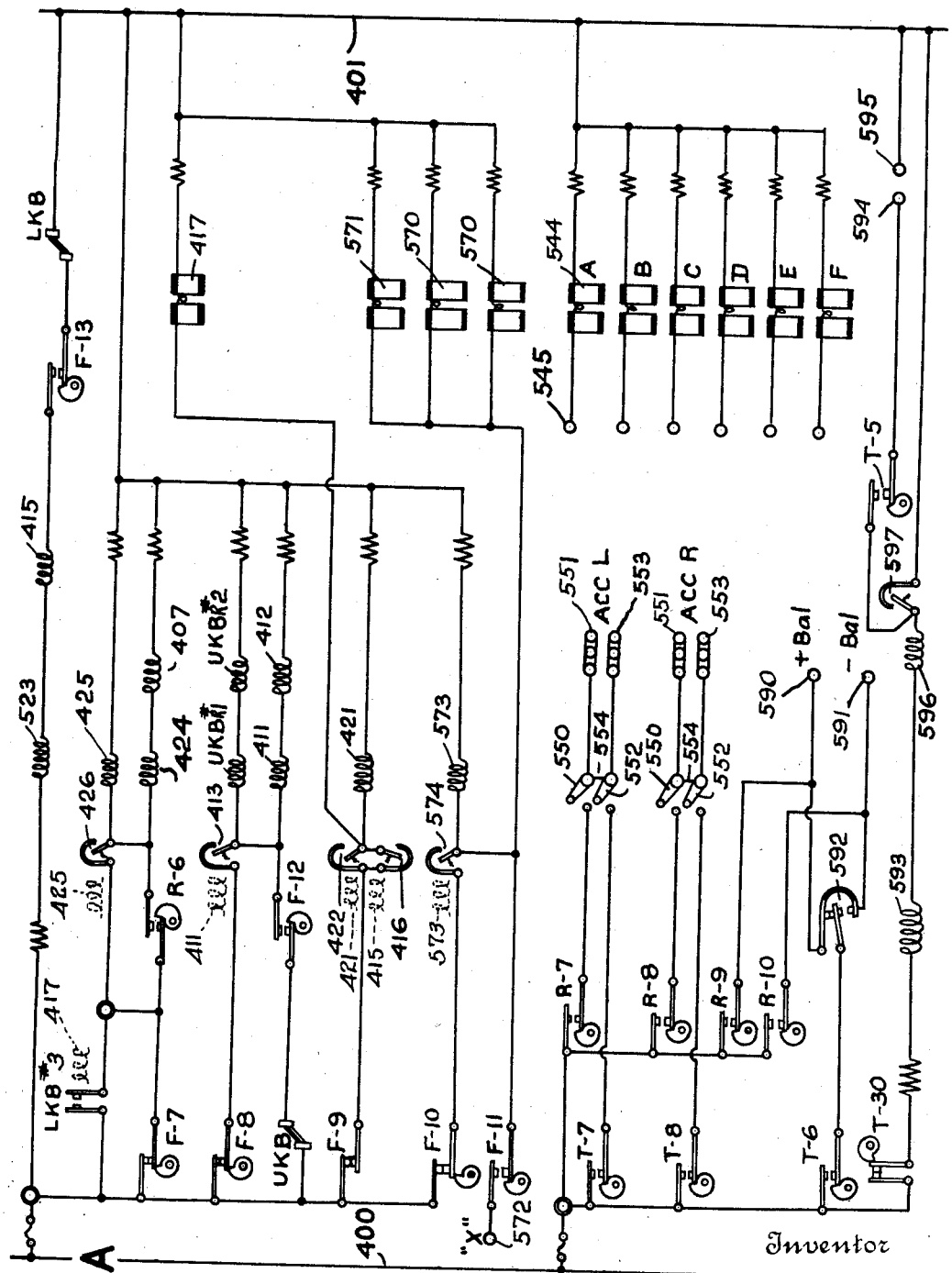

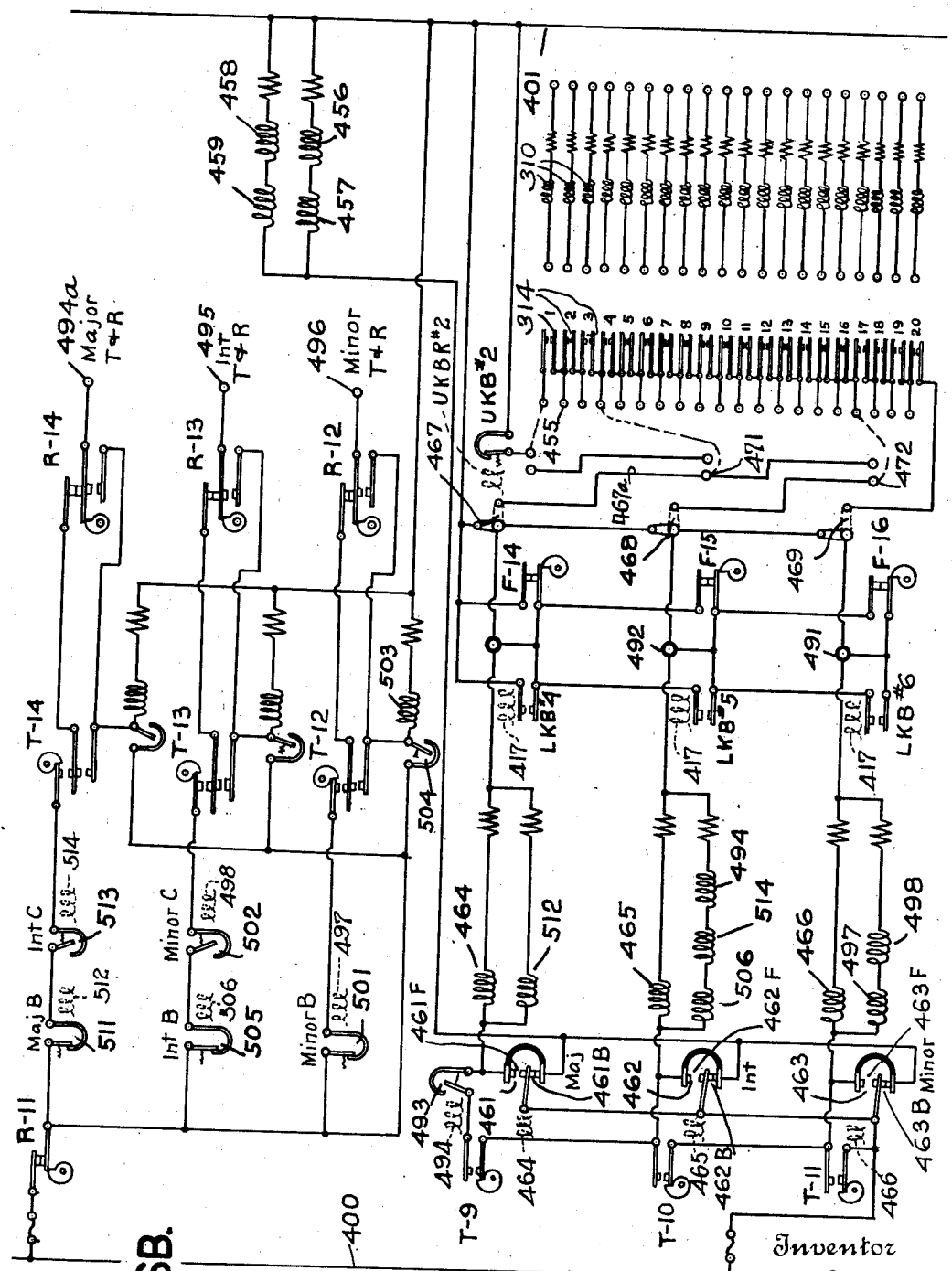

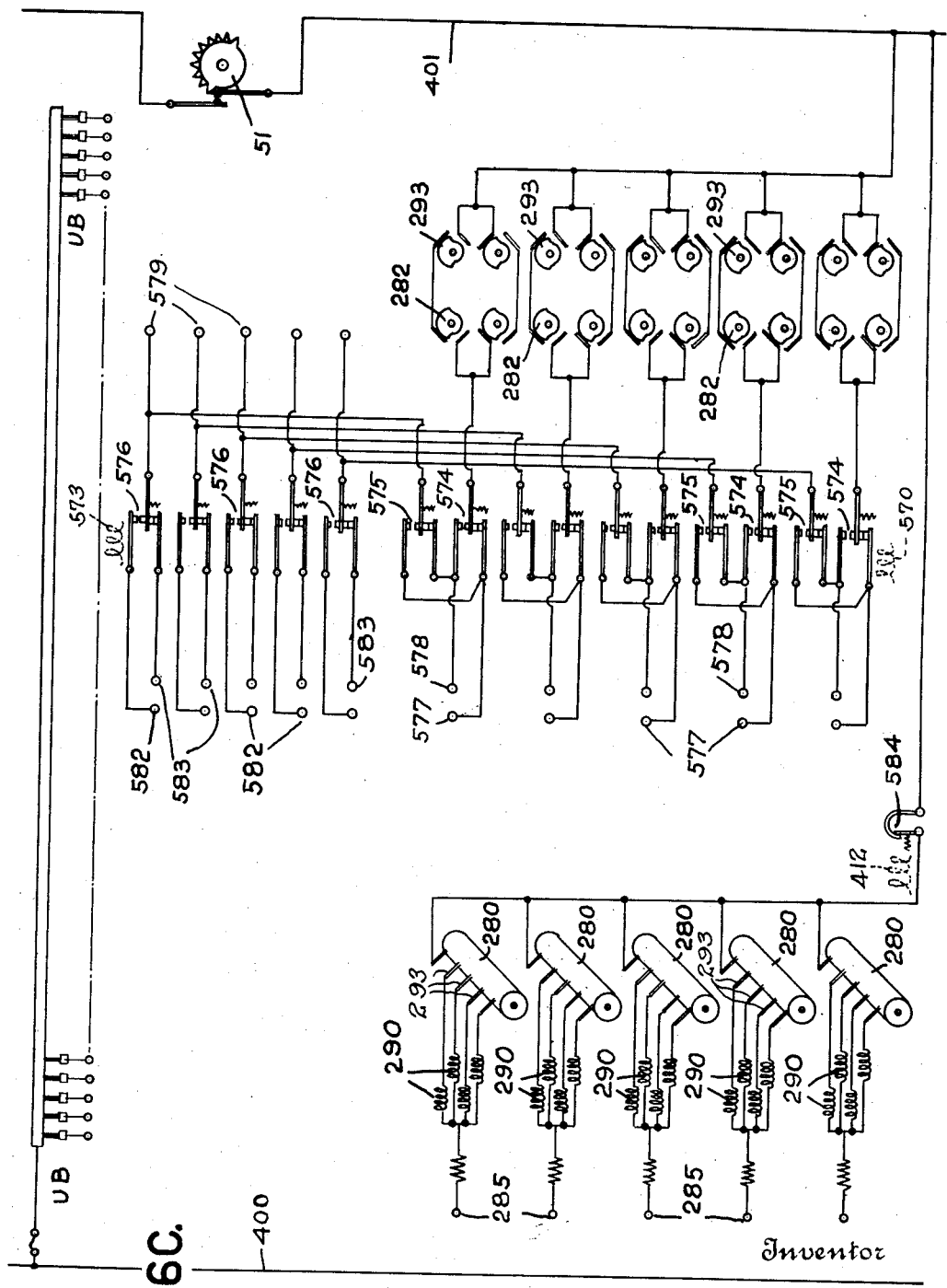

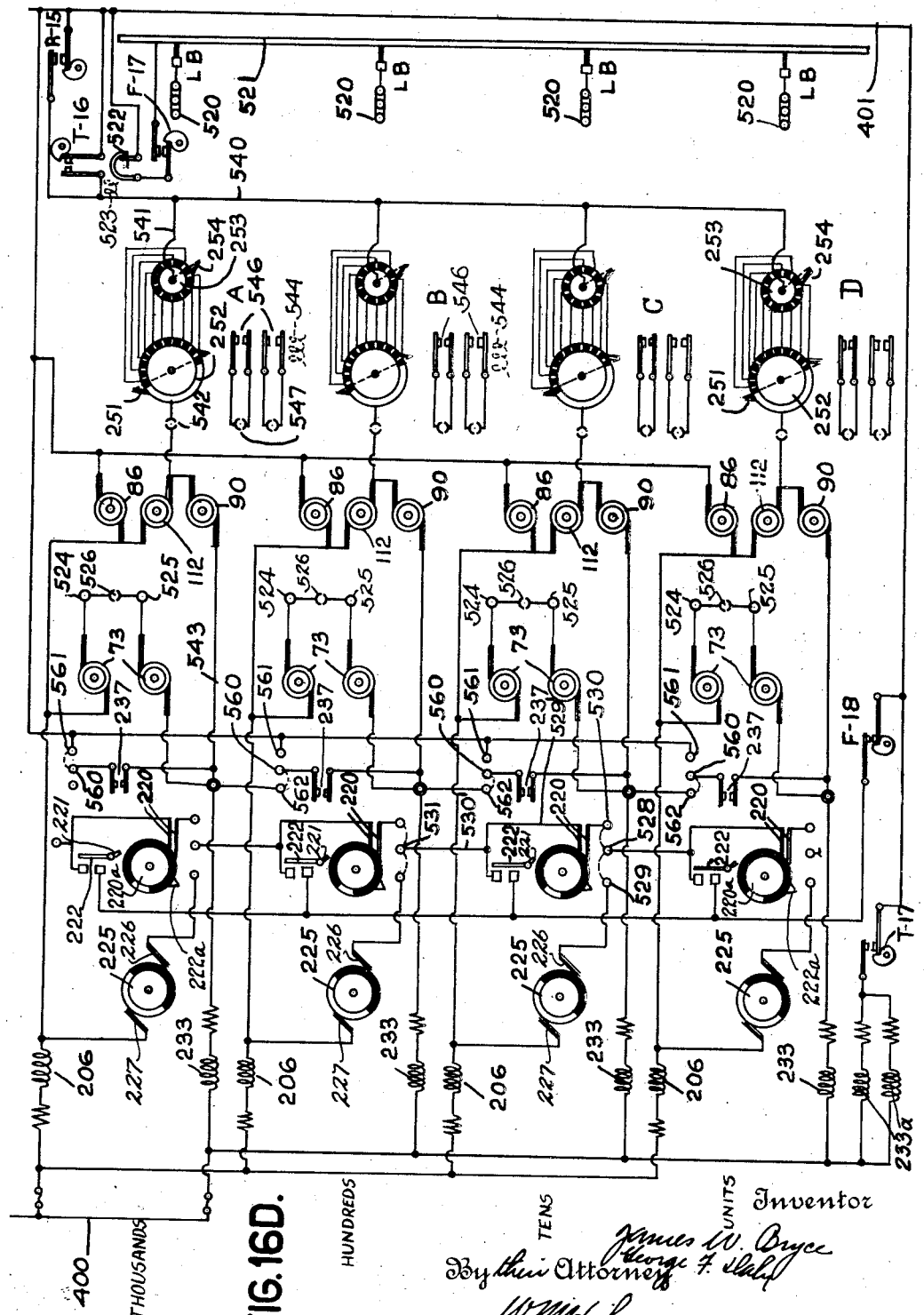

April 4, 1939.  J. W. BRYCE ET AL  2,153,167
TABULATING MACHINE
Filed Feb. 21, 1930    22 Sheets-Sheet 19

April 4, 1939.  J. W. BRYCE ET AL  2,153,167
TABULATING MACHINE
Filed Feb. 21, 1930    22 Sheets-Sheet 22

Patented Apr. 4, 1939

2,153,167

UNITED STATES PATENT OFFICE 2,153,167

TABULATING MACHINE

James W. Bryce, Bloomfield, N. J., and George F. Daly, Johnson City, N. Y., assignors, by mesne assignments, to International Business Machines Corporation, New York, N. Y., a corporation of New York Application February 21, 1930, Serial No. 430,257

5 Claims. (Cl. 235—61.7)

The invention concerns accounting machines and has for its principal object the provision of a printing tabulator of extremely flexible operation and control.

The improvements according to the present invention are adapted in whole or in part to many types of accounting machines but for the purpose of visualizing their operation in a complete unitary assembly they will be described in connection with a printing tabulator of the electric type. Such a tabulator is provided with analyzing brushes which electromagnetically control adding, printing and controlling units of the machine. Numerical data may be represented by perforations differentially located on record cards and the machine is operated by passing the record cards one at a time beneath the analyzing brushes. An analyzing brush on encountering a perforation effects an electrical impulse differentially timed according to the perforation which caused it. The impulses are used to energize accumulator, printing or control magnets to add, print or control machine operation according to the numerical data on the record cards. The printing mechanism may be controlled from the adding mechanism to print totals. As before, the printing magnets are operated from differentially timed impulses but the total taking mechanism is arranged so that these impulses are governed by the data standing on the adding elements instead of from perforations in records.

In addition to data which is to be added the cards contain group designating data identifying the classifications in which the additive data belong. An automatic control system is arranged to continue adding operations from successive cards as long as the group designating data remains the same, but, when the group designating data changes, the control system provides for stopping the machine or causing it to take an automatic total. The more elaborate types of machines permit the control data to be divided into several sections generally referred to as the major, intermediate and minor sections. A change in the major designations causes the machine to be set up for taking all totals; a change in the intermediate section causes the machine to be set up for intermediate and minor totals only; and a change in the minor section causes the machine to set up for minor totals only. These different sorts of totals may be initiated either automatically or through manual control.

The more modern types of tabulators are also adapted for subtraction as well as addition, subtraction being effected by the addition of complements of the numbers being handled. In the machine selected for the present disclosure each item entering into the subtraction operation is entered into two accumulators, into one in its actual value and into the other in its complementary value. These two accumulators are assigned to positive and negative balances and a positive item is entered into the positive accumulator in its true value and into the negative accumulator in its complementary value. A negative item is entered into the negative accumulator in its true value and into the positive accumulator in its complementary value.

At the end of a run of cards which contain positive and negative data the true value of the difference between positive and negative items appears on the positive accumulator if the balance is positive and on the negative accumulator if the balance is negative. The other accumulator in either case shows the true or tens complement of the balance. Provision is made for selecting the accumulator containing the true balance for automatic printing on a change of card group. This brief general description of the machine will aid in an understanding of the following objects of the invention.

One object is to provide a machine which shall be more flexible in operation than the former machines of this class. This is effected by new plugging arrangements which permit a greater degree of selection of the different units for operation.

A more specific object in this respect is the provision of call or selecting devices which may be plugged to different control units and which in response to the operation of the control units will call into operation any group of operating units. For example, a certain accumulator may be arranged to print its total either with or without reset or zeroizing or a certain accumulator may be arranged to print its total and reset only on a change in group in a specified section of the control.

Still another object is to provide for these features by multi-contact relays whose coils may be selectively connected to the several control elements such as the major or minor control and the several total taking controls such as total with or without reset and whose contacts may be arranged to call into operation any desired accumulator or printing units.

A further object of the invention is to provide a machine of this type with a simplified driving system. A single motor is arranged to drive a main operating shaft to which the several mechanisms of the machine may be clutched either singly or in combination. For example, one clutch may control the card feed, another the printing mechanism, a third the reset mechanism and a fourth the totaling mechanism. Through these separate driving clutches for connecting the different mechanisms to a single main shaft, all the required operations may be performed with a minimum operation of machine parts.

Another object of the invention is to provide an improved automatic control system which on a change of card group causes selected accumulators to total print with or without resetting or to reset without total printing, if desired.

Another object of the invention is to improve the timing of machines of this nature to simplify the entry of complements. Formerly, certain entries have been started in one machine cycle and terminated in the following machine cycle. Such expedients are avoided in the present case by shifting the home position of the machine so that the entering portion of the cycle is arranged to receive the largest entry in a single machine cycle that is, the overlapping of cycles heretofore required is made unnecessary.

Another object of the invention is to provide for the formation of subtraction banks on which a plurality of balances may be calculated concurrently.

A more specific object of the invention is to provide an improved card control replacing the card lever contacts formerly in use. This contemplates the use of a brush similar to the well known analyzing brushes but cooperating with imperforate portions of the card and controlling relays according to the presence or absence of cards in the feeding section in the same manner as the card lever contacts formerly operated. This obviates constructional and operating difficulties inherent in the older card lever systems.

A further object of the invention is the provision of new and improved zero printing mechanism.

Another object of the invention is the provision of a new plugging arrangement to assist in the previously mentioned flexibility of machine operation. In the present case three pluggable circuits are provided for the printers and accumulators, one pertaining to addition only and another to listing only and a third to concurrent adding and listing. Any one of these circuits may be plugged to the analyzing brushes to be controlled from the record card columns.

Another object of the invention is the provision of improved total taking and reset mechanism. Formerly reset occurred as an incident to total printing and in the same machine cycle. In the present case a plurality of total taking cycles may occur without reset followed by a single reset cycle in which any desired accumulators which have been active during the total taking cycles may be reset.

These and other objects, which will be pointed out as the description proceeds, will be clear from the following detail description which should be read in connection with the accompanying drawings in which, Fig. 1 is an exterior view of a complete machine embodying the principles of the invention;

Figs. 2 and 3, placed end to end, form a horizontal section of the machine illustrating the relative positions of the drive, accumulators, translators control and card feed;

Fig. 4 is a fragmentary vertical section illustrating the clutches and accumulators;

Fig. 5 is a vertical section at right angles to that in Fig. 4 showing the printing mechanism and details of the drive;

Fig. 7 is a vertical section through the accumulators and translators;

Fig. 12 is an enlarged section through one of the accumulators;

Figs. 13 and 14 are detail isometric views illustrating the operation of the translators and showing the parts in different positions;

Figure 17:
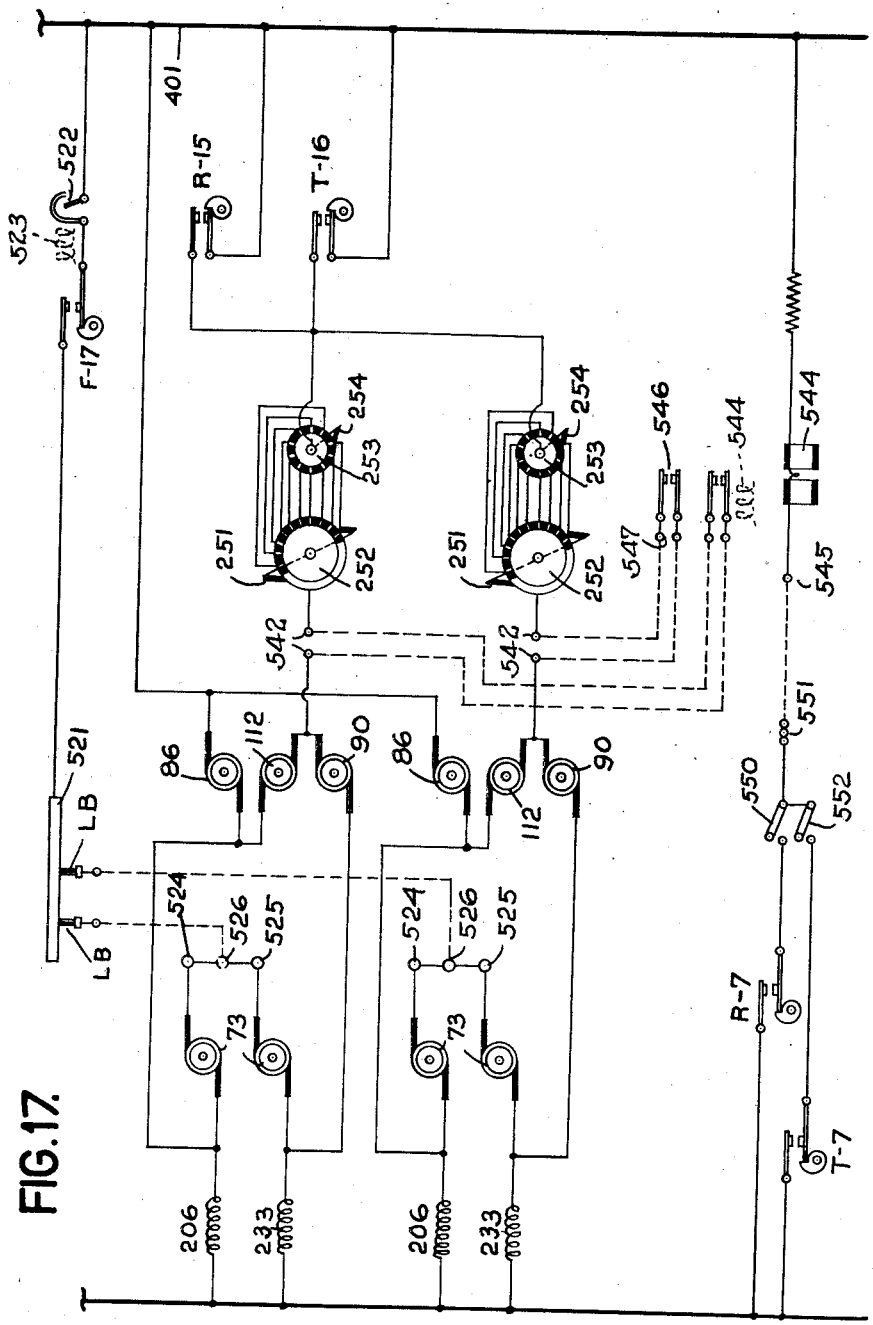
Figure 18:
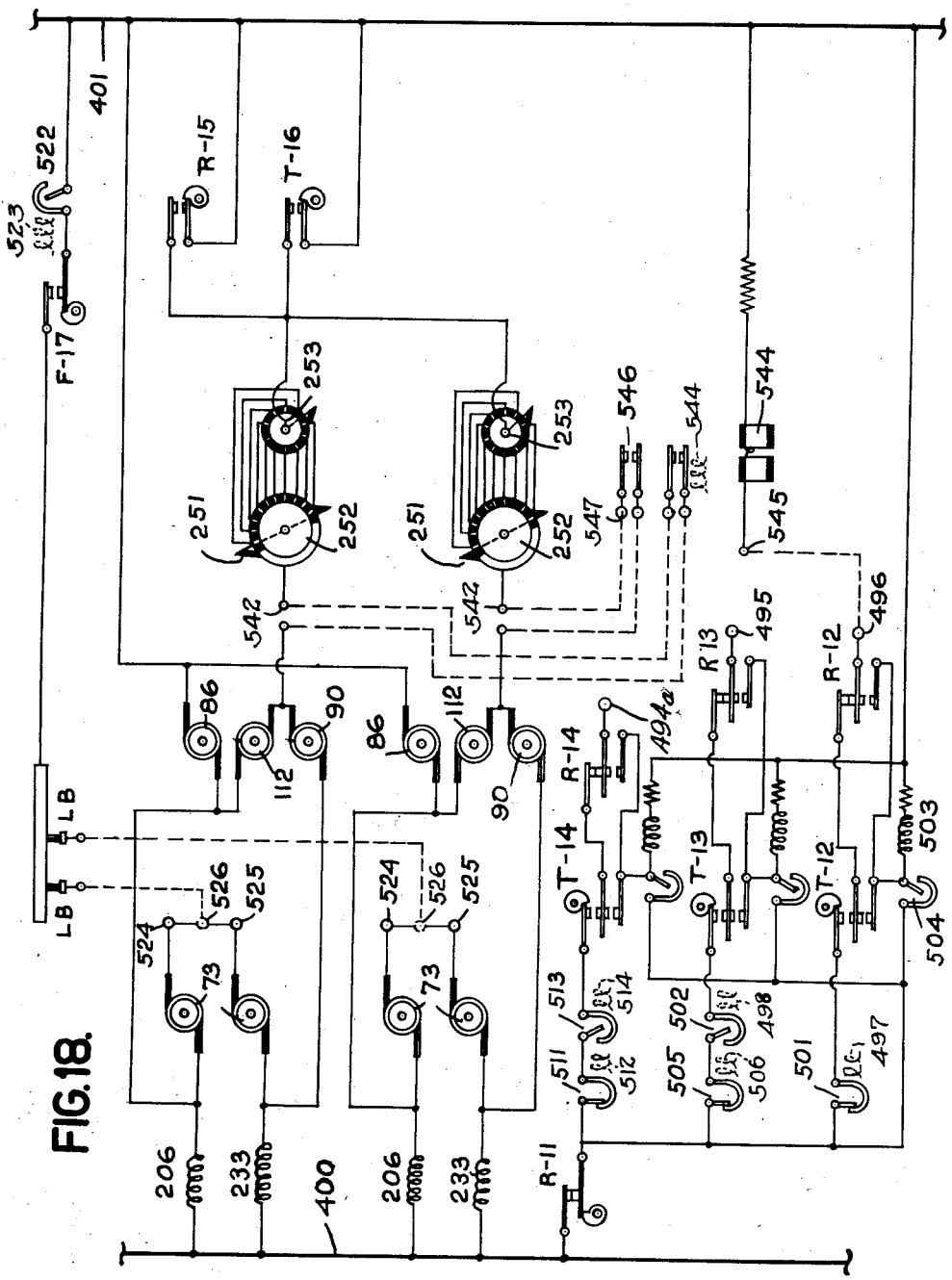
Figure 19:
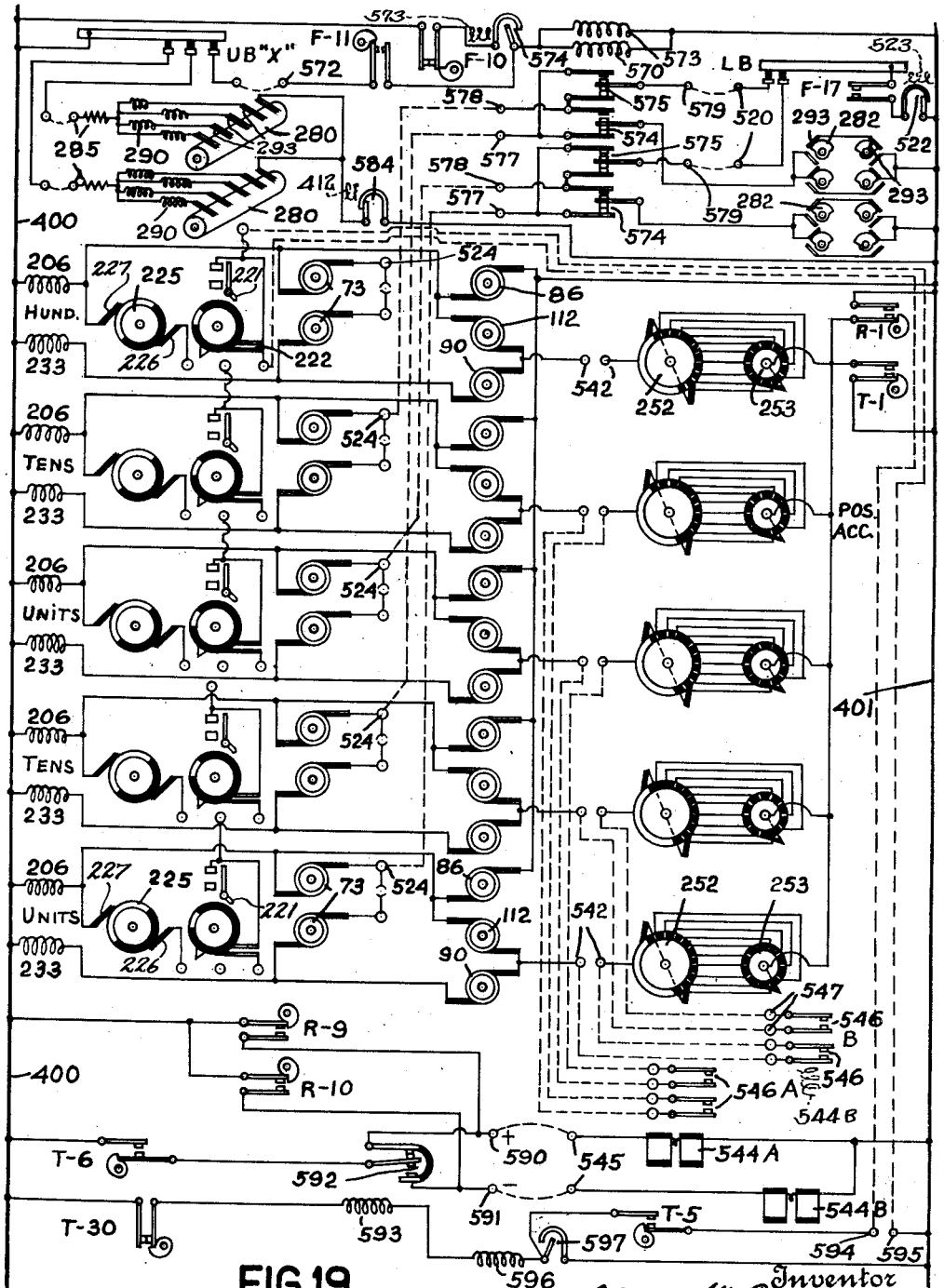
Figure 20:
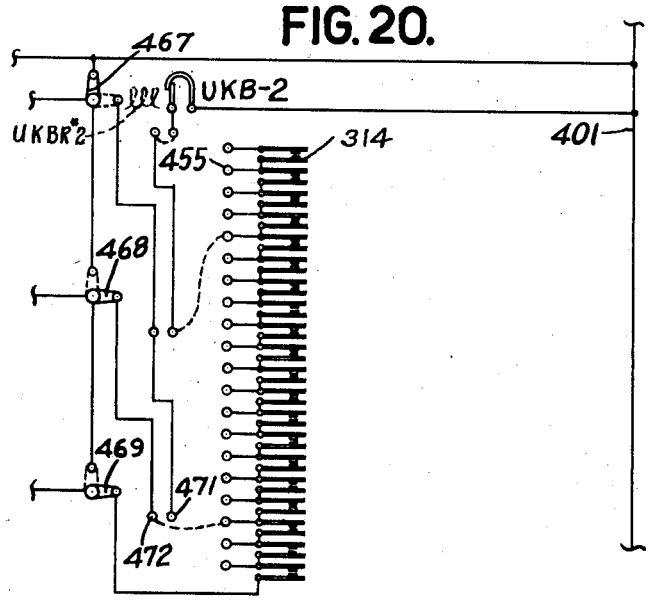
Figure 21:
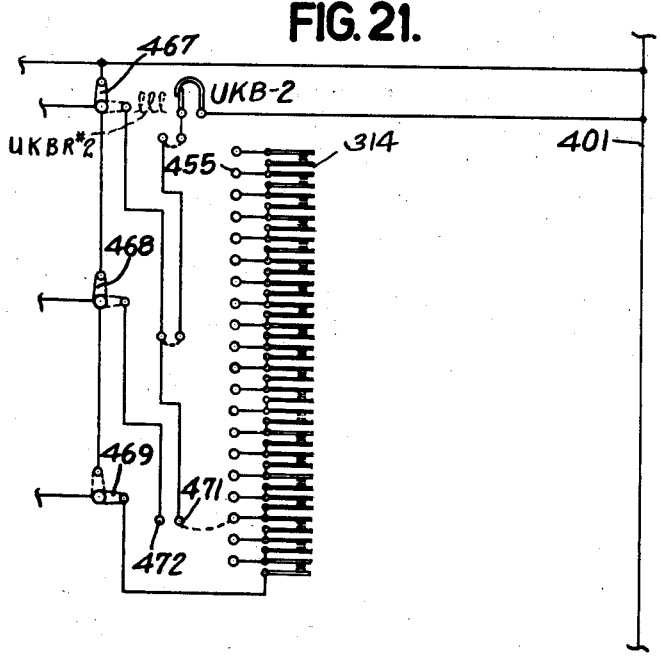

Figs. 16, 16A, 16B, 16C and 16D, when placed side by side from left to right in the order named, form a complete circuit diagram of the machine;

Fig. 17 is a simplified circuit diagram, compiled from the main diagram to illustrate the method of selectively taking totals from and resetting the different accumulators and containing only the circuits involved in this operation;

Fig. 18 is a simplified circuit diagram illustrating the method of selecting the different accumulators for total taking on classification changes in the different sections of the control;

Fig. 19 is a simplified circuit diagram illustrating the subtracting operation and the method of selecting the proper accumulator for printing the true balance; and, Figs. 20 and 21 are fragmentary circuit diagrams illustrating the manner of plugging for intermediate and minor control and minor control respectively.

Figure 1:
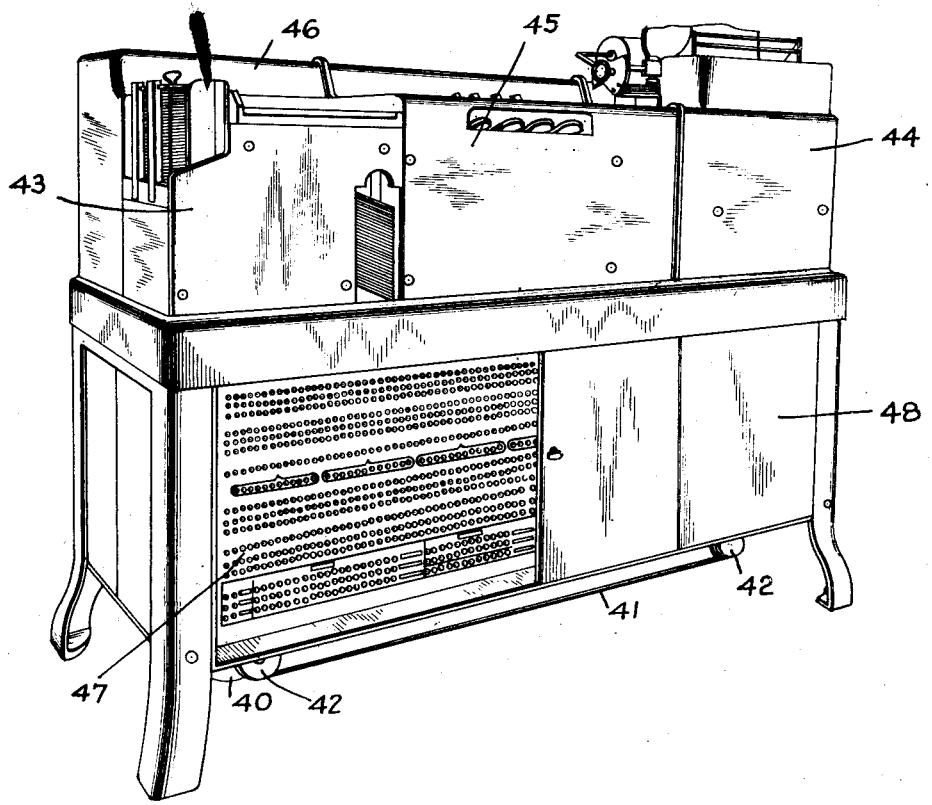

The general appearance and arrangement of the machine is shown in Fig. 1. Power is furnished from an electric motor 40 located near the bottom of the machine and connected to vertical and horizontal shafts through belt 41 and pulleys 42. The upper portion of the machine contains the card feed section at 43, the printing section at 44, with the translating mechanism for converting true numbers represented on cards into complements, between the two at 45. Behind the card feeding and translator section is the accumulator section 46. The plug board is mounted in vertical position in the lower front section of the machine at 47 and hinged doors 48, one set of which have been omitted, protect the plug board and its several plugging cords when the machine is in operation.

Behind the plug board and beneath the card feeding, translator and accumulator sections are mounted the numerous relays and cables necessary for the several operating elements of the machine. Owing to the large number of relays and contacts it is preferable that they be mounted on hinged panels which may be swung out to permit easy access for replacement and repair.

Drive

Owing to the complicated nature of the driving mechanism a detailed explanation of the manner in which it supplies power to the several operating units will first be given, after which it will be explained in detail how the power is utilized to operate the units.

The driven pulley 42 (see Fig. 5) is fixed to a shaft 50 which carries a plurality of cams 51 whose purpose is to cause contacts to make and break quickly to furnish impulses of accurately timed occurrence and duration to control the adding and listing units. A worm on drive shaft 50 operates a vertical shaft 52 which, through spiral gears 53, drives the main clutch shaft 54 of the machine. The several operating mechanisms such as the card feed, totaling control mechanism, reset mechanism and printing mechanism are selectively driven from this shaft through suitable one revolution clutches electromagnetically controlled so that they may be called into operation as desired.

Card feed

Figure 3:
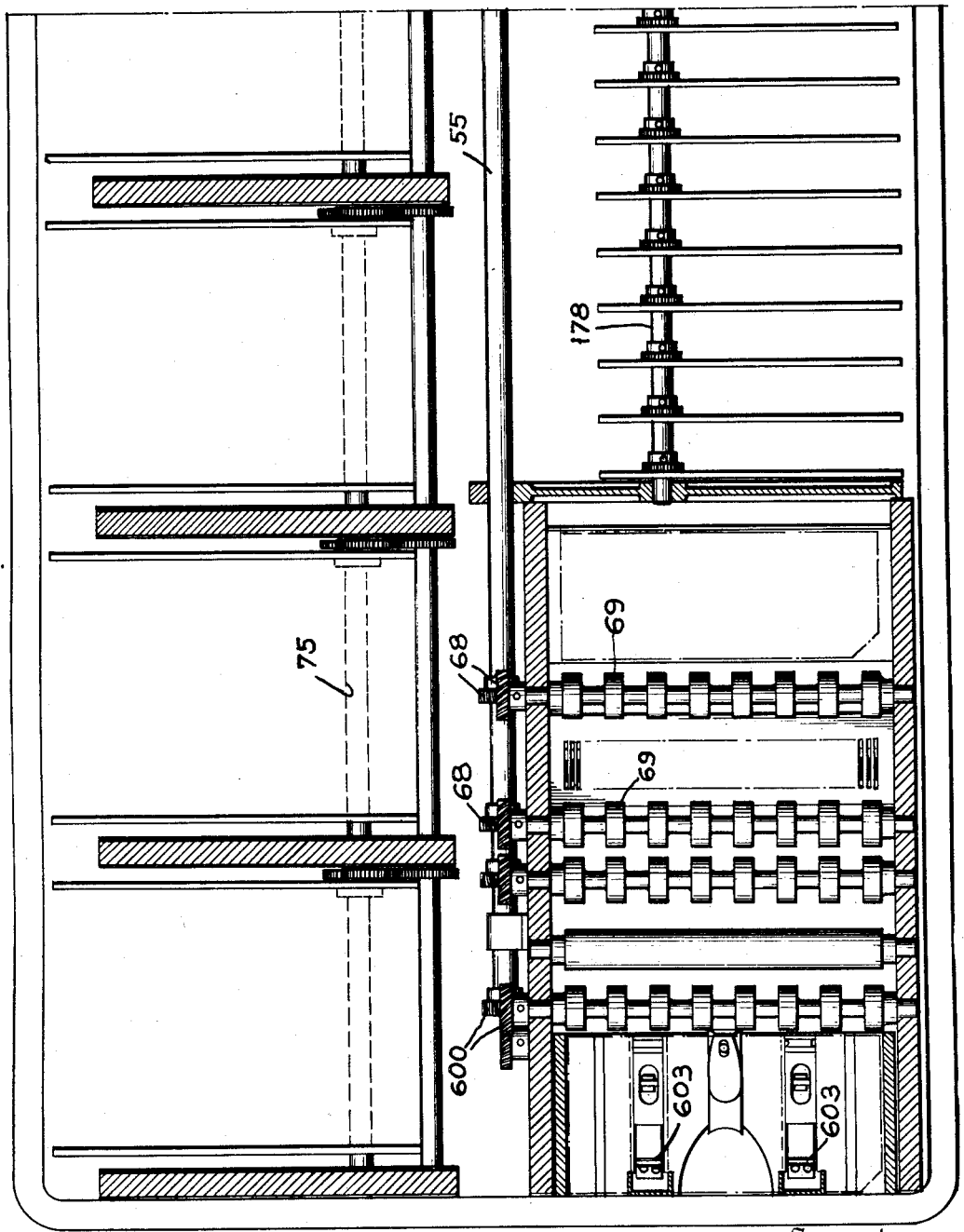
Fig. 3A is a section through the card feed mechanism.
Fig. 3B is a detail of a key brush.
Figure 8:
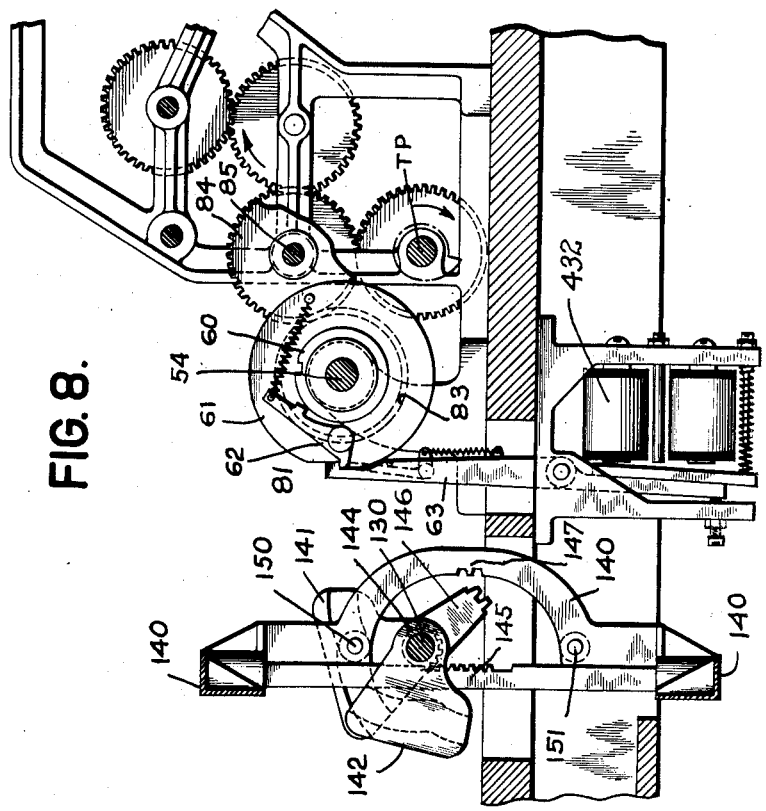
Fig. 8 is a detail showing the operation of the type operating crosshead and the total print clutch and drive.

The card feed shaft 55 (see Figs. 2, 3 and 5) is controlled from a card feed clutch 56. This clutch is not illustrated specifically but is identical with that shown in Fig. 8 illustrating a similar clutch for total printing. Generally these clutches comprise a notched disk 60 fast to the main clutch shaft 54 constituting the driving element of the clutch and a disk 61 free on the shaft and comprising the driven element of the clutch. The disk 61 carries a pivoted pawl 62 urged by a spring against the periphery of the disk 60 but normally maintained in inoperative position by a pivoted latch 63 carrying the armature of a controlling magnet 432. When the controlling magnet 432 is instantaneously energized the latch 63 is rocked about its pivot to release pawl 62 which thereupon engages the notch in disk 60 at a predetermined time in the cycle whereupon the disk 60 is driven with shaft 54 for one complete revolution. At the end of the revolution, latch 63, being now released by the magnet, reengages the tail piece of pawl 62, disengaging the clutch and holding disk 61 in its home position. The similar card feed clutch, referring back to Fig. 2, has a gear 66 fixed to its driven element meshing with a gear 67 fast to the card feed shaft 55. When the driving and driven elements are clutched together the card feed shaft 55 rotates. This shaft (see also Fig. 3) through spiral gearing 68 drives the card feed rolls 69 and the card picker mechanism as will be hereinafter explained. Certain cams for operating card feed contacts which are designated hereafter as F—, followed by a numeral; and a commutator (see Figs. 4 and 5) are also driven from the card feed shaft. The commutator 73 and card feed cams are mounted on a shaft 70 carrying a gear 71 which meshes with an idler 72 which also meshes with gear 66 fixed to the driven element of the card feed clutch.

The card picker mechanism is illustrated in Fig. 3A. The card feed shaft 55 through spiral gears 600 drives an eccentric 601 which is connected to the picker arm 602. This arm reciprocates the picker 603 which feeds one record card from the magazine each cycle. After leaving the magazine the cards are fed by rolls 69, driven from the feed shaft 55 through spiral gears 68, between upper analyzing brushes UB and lower analyzing brushes LB and their cooperating conducting rolls. The upper and lower brushes are spaced apart so that a given card passes the lower brushes exactly one card cycle after it passes the upper brushes.

Figure 3B:
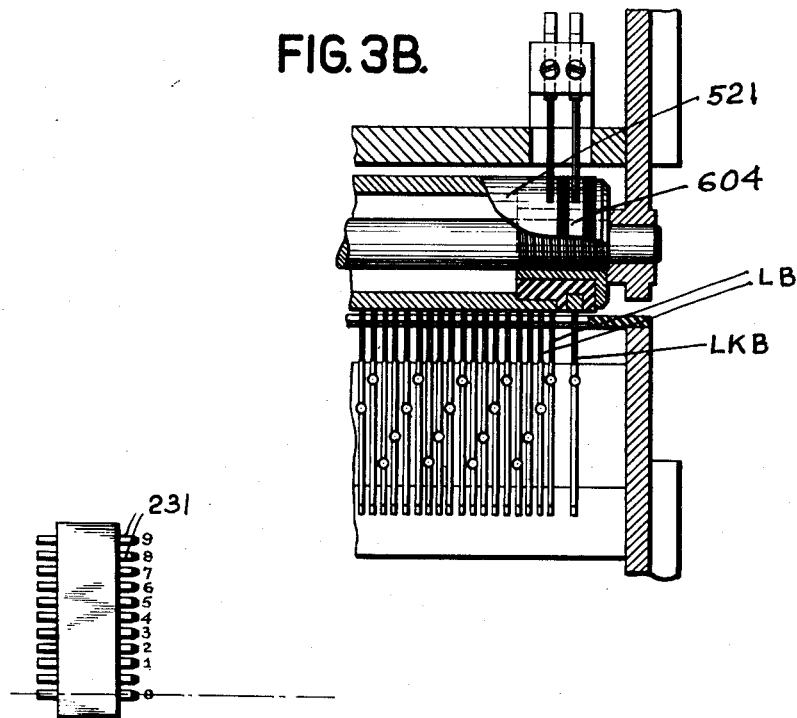

In line with the analyzing brushes are key brushes, of which the lower one is illustrated in Fig. 3B. The lower key brush LKB is arranged to cooperate with a portion of the cards in which no perforations are placed so that when a card is actually under the analyzing brushes the key brush will be insulated from the contact ring 604 but will engage it at other times

Accumulator drive

The accumulators are arranged in two horizontal rows, one below the other (see Figs. 4, 6 and 7) and are driven by two shafts 75 and 76. These shafts rotate as long as the main clutch shaft 54 is in operation. The lower shaft 75 carries a gear 77 which meshes with a gear 78 on main clutch shaft 54. Gear 77 also meshes with an idler 79 meshing with a gear 80 fixed on the upper accumulator drive shaft 76. The two drive shafts thus rotate in the same direction as long as the driving motor 40 is in operation.

Total control mechanism drive

That portion of the total control mechanism which is driven from the main machine drive consists largely of commutators and contacts. The total control mechanism clutch as detailed in Fig. 8 has been previously described in connection with the card feed driving mechanism. Referring to Figs. 2 and 5, in the former of which the total control mechanism clutch is designated generally as 81, a driven element consisting of disk 61 carries a gear 83 (see also Fig. 8 meshing with a gear 84 fast to a shaft 85 which carries one of the total taking commutators 86 (see Fig. 5). The gear 84 also meshes with a gear 87 which in turn meshes with a gear 88 fixed to shaft 89 which carries another total taking commutator 90. The cams for operating the total control cam contacts 94 which will hereinafter be designated by T— followed by a numeral are indicated at 95 and mounted on a shaft 96 carrying a gear 97 also meshing with the gear 84. As long as the total printing clutch is in operation shafts 85, 89 and 96 rotate to operate the total taking commutators and cam contacts.

Reset mechanism drive

The accumulator reset mechanism is also controlled by a one revolution clutch similar to the total printing and card feed clutches. The disk or driven portion of the reset clutch, which is designated generally at 98 (Fig. 2) carries two gears 100 and 101. The gear 100 has teeth around its entire periphery but the gear 101 (see also Fig. 10) is mutilated having teeth around slightly over half its periphery, the remaining portion carrying a plate 102 forming a Geneva locking plate. The gear 100 (Fig. 2) drives a gear 103 fast to a sleeve 104 freely rotatable on the reset shaft 105.

The drive in this case is in two to one ratio so that the sleeve makes two revolutions for one complete revolution of the gear 100 or in other words, for each reset cycle of the machine. Fast to the sleeve 104 is a gear 106 meshing with a gear 107 (see also Fig. 5) fixed to shaft 108 carrying reset commutator 112. The gear 107 also meshes with a gear 113 freely rotatable on shaft 89, which meshes with a gear 114 fixed to shaft 115 which carries cams 116 for operating the reset cam contacts 117 which will hereinafter be referred to by R— followed by a numeral. During the first portion of the resetting operation the reset shaft 105 rotates but during the second portion it is stationary, being locked by the Geneva locking plate 102 (Fig. 10) cooperating with a locking member 121 fixed to driving gear 122 fast to the lower reset shaft 105. The upper reset shaft 125 (see also Fig. 6) is driven from the lower one through a gear 126 fixed to the lower reset shaft 105 and meshing with an idler 127 free on the upper accumulator drive shaft 76, the idler in turn meshing with a gear 128 fixed to the upper reset shaft 125. The second portion of the reset cycle is idle, that is the reset shaft is stationary, because, as will be explained later, resetting is effected by entering complements and therefore the resetting operation proper must be coordinated to the accumulator drive. Entries are made into the accumulators only during the first portion of each cycle.

There is a commutator 73, 86, 90, and 112 for each accumulator order. These commutators are driven as described and have configurations as shown in Figs. 5 and 6. The commutators are grouped on common shafts 70, 85, 89 and 108 respectively and each has cooperating brushes in engagement therewith. The commutators serve as circuit breakers in place of the more conventional cam contact devices.

*Type bar and paper feed drive*

The print shaft 130 (see Figs. 2, 5 and 8) is controlled from a one revolution clutch 131 entirely similar to those previously described and controlled from the magnet 434 (see Fig. 5). The driving element or disk is free on the shaft 130 and fast to a gear 133 meshing through an idler 134 with a gear 135 fast to the main clutch shaft 54. This driving element, of course, rotates with the main clutch shaft 54. When the printing clutch is engaged the printing shaft 130 rotates, its purpose being to raise and lower the type bar cross head 140 (see Fig. 8). It raises the cross head with a steady motion through pinion 144 meshing with a rack 145 on the cross head. It lowers the cross head through a sector 146 cooperating with a rack 147 on the cross head. Both the up and down movements are started by slotted cams 141 or 142 cooperating with pins 150 and 151 respectively which are mounted on the cross head. The mechanism for reciprocating the crosshead 140 is set forth in more minute detail in Patent No. 1,830,765, granted to R. E. Page on November 10, 1931, and reference may be had to such patent for further structural details. Certain mechanisms concerning the printing operation are also controlled from a constantly running shaft 155 which is an extension of accumulator drive shaft 76 (Figs. 4 and 5). This shaft carries a cam for operating certain restoring mechanism of the printing magnet armatures and type bar stop pawls and also cams for operating the zero printing mechanism as will be explained later.

Figure 9:
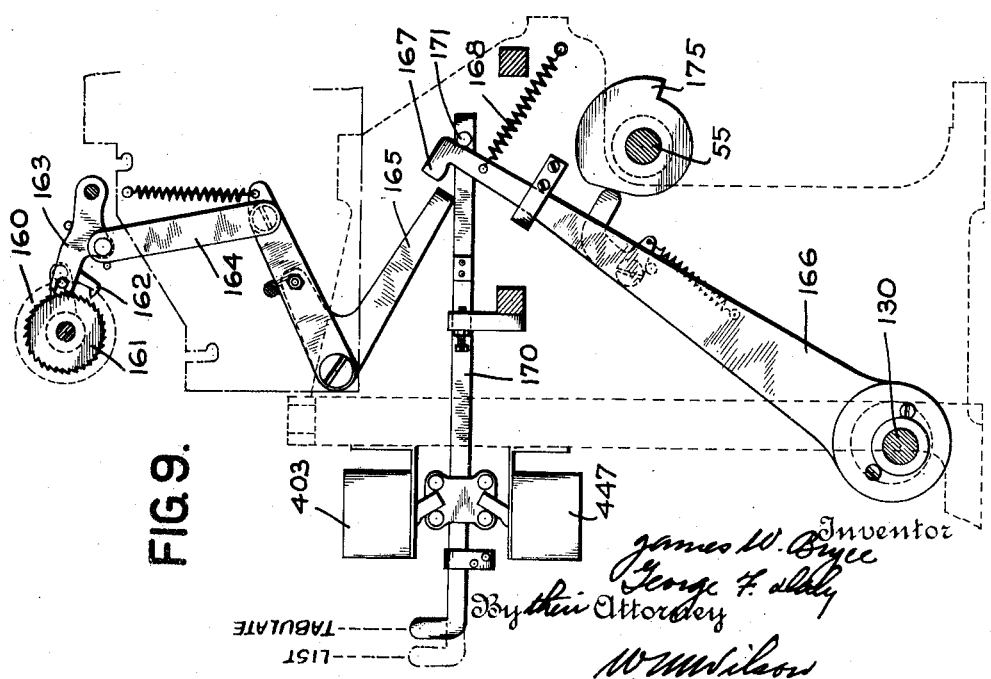
Fig. 9 is a detail showing the list-non-list lever and the paper feed.

The paper feed drive is shown in Fig. 9. The platen 160 carries the usual ratchet wheel 161 operated by a stepping pawl 162 operated by a lever 163. Through suitable linkage 164 the lever 163 may be lowered carrying the stepping pawl 162 into engagement with the ratchet wheel teeth and feeding the platen one step each time the link 164 is lowered. Link 164 is pivoted to one arm of a bell crank 165 which is operated by a member 166 mounted on an eccentric fast to the printing shaft 130.

As the printing shaft rotates this member 166 moves up and down. At its upper end it is provided with a hook portion 167 which may be moved into or out of cooperation with the lower arm of bell crank 165. A spring 168 tends to hold the hooked portion 167 free of the bell crank. When the list-non-list lever 170 is pushed to the left in Fig. 9 to the dotted line position representing listing position a pin 171 holds the hooked portion 167 in cooperation with the bell crank 165 whereupon each rotation of the printing shaft causes the platen to feed one step. When the lever 170 is pushed to the right as indicated in full lines the hooked portion 167 is normally free of the bell crank but may be moved into cooperating position with it by cam 175 fixed to the card feed shaft 55. Thus the paper will be fed even if the list-non-list lever 170 is in non-list position whenever the printing shaft 130 operates concurrently with the card feed shaft 55.

*Clutch interlocks*

The card feed should never operate concurrently with the total taking mechanism or reset mechanisms. Neither should the total taking mechanism operate concurrently with the reset mechanism. Mechanical interlocks are provided to prevent such undesirable concurrent operations. Referring to Fig. 8 it will be observed that the upper end of latch lever 63 must swing to the left or outwardly from the disk 61 to cause engagement of the clutch. As shown in Figs. 2 and 4 a bar 190 pivoted at 191 cooperates with the upper ends of the latch levers for the card feed clutch 56 and the reset clutch 98. If the upper end of the latch lever for either clutch swings outwardly to cause engagement of either clutch the lever 190 is rocked about its pivot 191 to prevent movement of the latch lever for the other clutch. Similarly lever 192 interlocks the reset clutch 98 with the total taking clutch 81 and the lever 193 interlocks the total control clutch with the card feed clutch.

*Control unit and translator drive*

The automatic control unit, whose purpose is to maintain the card feed and adding mechanisms in operation as long as group designating numbers on cards do not change, and the translators are driven from the card feed shaft directly as these elements should operate when and only when cards are feeding. Referring to Figs. 2 and 6, the card feed shaft 55 carries a gear 176 which, through an idler 177, drives the translator driving shaft 178. The gear 183 on the translator shaft which meshes with the idler 177 also meshes with a large idler gear 184 which in turn meshes with gears 185 and 186 on the upper and lower drive shafts 187 and 188 respectively, of the control unit.

*Adding and printing*

The counters or accumulators for effecting adding operations are shown in detail in Fig. 12 and are provided with the electric transfer system shown and claimed in the copending application to Daly and Page, Serial No. 217,076, filed September 2, 1927 now Patent No. 1,880,422, the accumulators proper being entirely similar to those in Patent No. 1,372,965. As previously explained the counter drive shaft 75 (see Fig. 12) rotates constantly as long as the machine is in operation. This shaft through a chain of gearing 200 drives a counter clutch shaft 201 on which are loosely mounted a series of gears 202, one for each counter element. Each gear 202 in turn meshes with a gear 203 fixed to the counter wheel 204. Each gear 202, in the usual manner, is provided with a hub having clutch teeth coacting with corresponding clutch teeth on a sleeve 205 which is splined to the shaft 201 so as to be free to slide longitudinally thereof but which rotates with the shaft.

An accumulator magnet 206 is provided to operate each accumulator element. As usual these accumulator magnets are energized at differential times according to the location of perforations in controlling records. Each is provided with an armature 207 mounted on a rotatable rod 208. An extension 209 on the armature 207 normally engages a stop 212 on a lever 213 pivoted at 214. The end of lever 213 projects into a groove in the sleeve 205. A spiral spring surrounding shaft 201 tends to rotate the lever 213 so that the clutch teeth on sleeve 205 will engage those on gear 202 and drive the latter with the shaft 201. As long as the magnet 206 is deenergized this clutch engagement is prevented through the cooperation of extension 209 with stop 212. On energization of the magnet 206 its armature 207 is attracted thereby releasing the stop 212 and permitting clutching action causing the accumulator wheel 204 to rotate. Toward the end of the cycle a knock-out plate 218 is operated normal to the plane of the drawing to knock out the clutch thereby leaving the accumulator wheel 203 with the reading represented on the index card which caused the energization of magnet 206. For further structural details of the well-known accumulator mechanism briefly described above reference may be had to Patent No. 1,307,-740, granted to C. D. Lake on June 24, 1919.

Transfer is effected electrically as in the copending application of Daly and Page, Serial No. 217,076 now Patent No. 1,880,422. Each accumulator wheel 204 has an attached commutator 220a (shown diagrammatically in Fig. 16D) with a single segment serving to bridge brushes 220 when the accumulator wheel stands at nine. The accumulator wheel also has a cam 222a (Fig. 16D) fixed to it with an extension which rocks pivoted lever 221 (Fig. 12) when the accumulator wheel passes through zero.

The lever 221 when thus rocked closes a knife switch 222 which knife switch 222 is in series with the accumulator magnet 206 of the accumulator wheel of the next higher denominational order and a parallel circuit likewise extends through the brushes 220 of this higher order to the next accumulator magnet in the series. Shortly after the adding portion of the cycle the commutator 225 fixed to the accumulator drive shaft 75, through a metallic segment bridges brushes 226 and 227 (Fig. 12) thereby providing a transfer impulse which energizes the accumulator magnets 206 whose circuits have been prepared for operation through the brushes 220 and the knife switches 222. In this case only one unit is entered on the accumulator wheels which are to receive transfer, the clutch being kicked out by the restoring bar 218 after this single unit is entered.

The machine, as previously explained, is provided with a cross head 140 (see also Fig. 8) which is raised and lowered as explained, through the operation of the printing shaft 130. On the cross head there is a series of printing bars 229 which are releasably operated by the cross head through a spring pressed pawl 230 mounted thereon and engaging a notch in the lower end of the type bar. At its upper end the type bar is provided with printing type 231 corresponding to the different digits. The type bar rises with the cross head so that each type 231 arrives opposite the platen 232 at the point of the machine cycle corresponding to the operation of the accumulator elements to enter the corresponding digits. The type bar may be arrested in position to print from any type by a printing magnet 233 which in listing operations is controlled by timed impulses initiated by the cooperation of perforations in cards with the analyzing brushes LB (see also Fig. 12).

Energization of a print magnet 233 attracts its armature and pulls a call wire 234 to the right thereby releasing a latch 235 which normally holds stop pawl 236 free of ratchet teeth 237a on the type bar. When the pawl 236 is released it is spring actuated into engagement with the proper ratchet tooth 237a to prevent further upward movement of the type bar thus holding the proper type 231 opposite the platen. This arresting of the type bar does not interfere with the upward movement of the cross head 140 as the spring operated pawl 230 is merely cammed out of the notch in the lower end of the type bar.

Zeros are not printed directly from the normal controls of the machine but as usual according to the presence of digit printing on a type bar to the left. The type bars (see Fig. 5A) carry the 1 to 9 type in the usual manner but the normal space for the zero type is provided with a blank slug so that if the type bar is stopped in this position no printing will result. The zero type is placed in lowermost position so that if the bar rises to its uppermost position zero will be printed. If zero printing is to be suppressed the type bar must be stopped by pawl 236 with the blank slug opposite the printing line. Special contacts 237 are provided to carry the impulses to the print magnets as the blank slug arrives opposite the printing line. The contacts 237 are held open by levers 245 which are normally held against the resiliency of contacts 237 by a bail 239 carried by arms 240. Cams on shaft 155 hold the bail depressed until the 1 ratchet tooth on the type bar passes the stop pawl 236. At this time the cams on shaft 155 permit bail 239 to rise, releasing levers 245 to the resiliency of spring contacts 237.

Figure 5A:
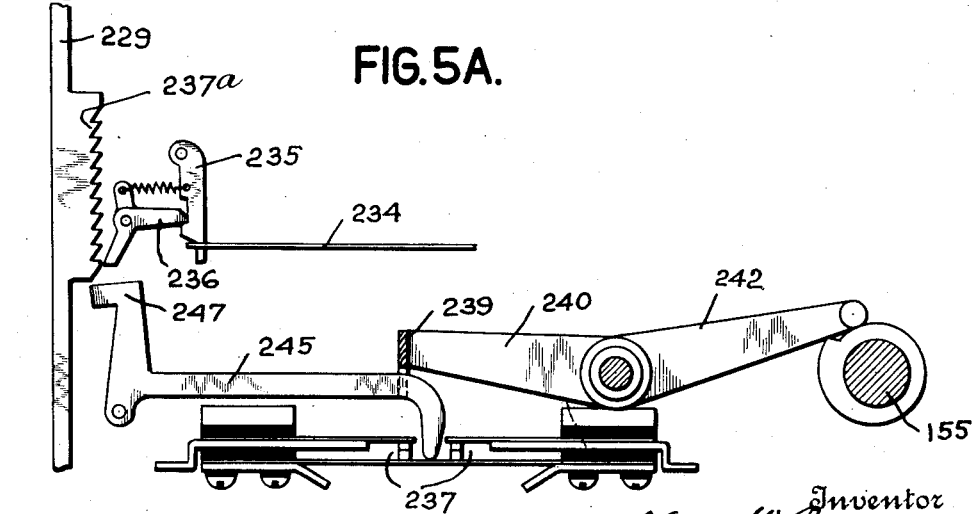
Fig. 5A is a detail of the printing mechanism illustrating the operation of zero suppression.
Figure 6:
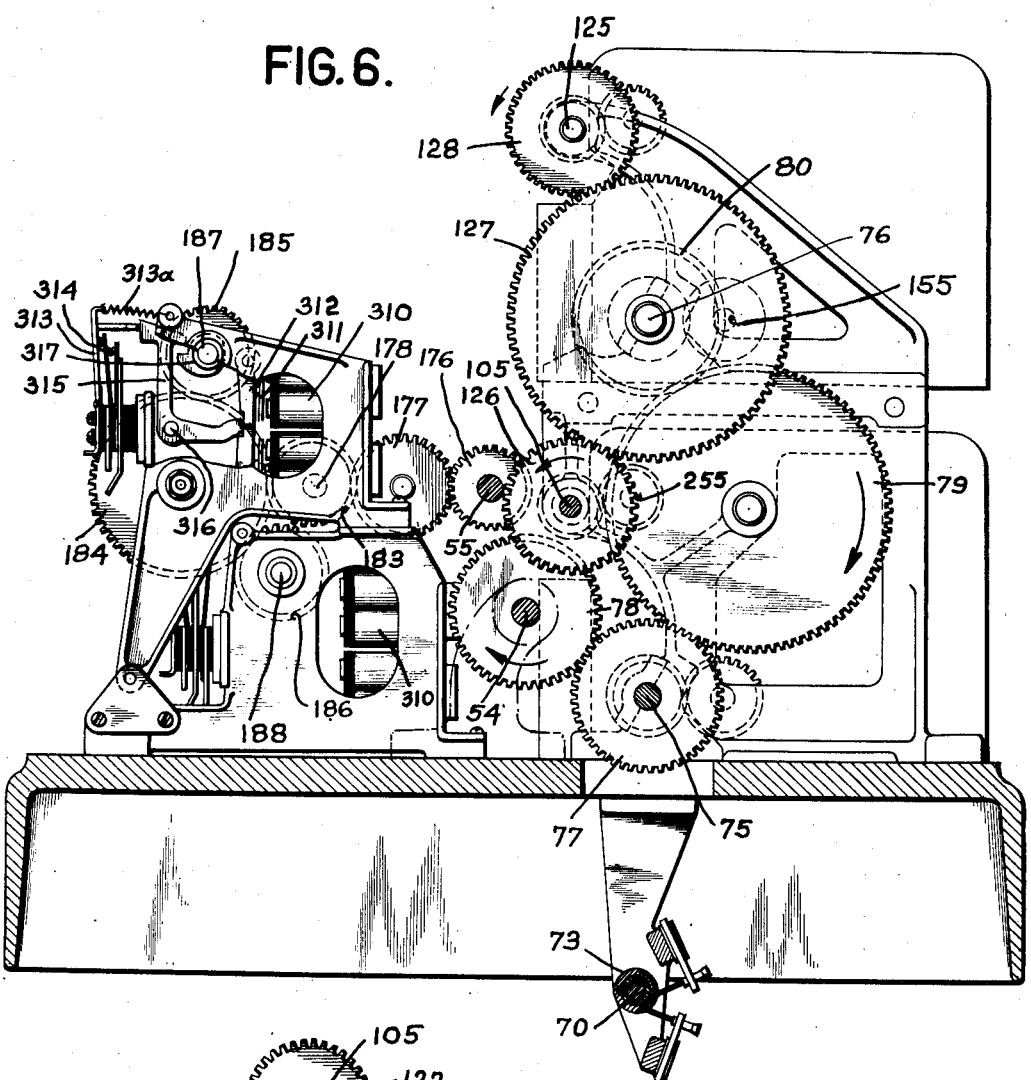
Fig. 6 is a vertical section, showing the drive mechanism for the accumulators.

An inspection of Fig. 5A will show that if any type bar has been stopped in position to print from type from 1 to 9 the lever 245 is held in position to maintain the contacts 237 open, the lever 245 having an extension 247 cooperating with the ratchet on the type bar for this purpose. If any type bar has not been stopped at this time its ratchet will have cleared extension 247 of lever 245 and lever 245 will assume the position shown in Fig. 5A, the contacts 237 closing for this particular type bar. An impulse is sent through any closed contacts 237 at this instant to the print magnet 233 of the type bar to the right. This operation, which will be explained more in detail in connection with the circuit diagram causes any type bar to the left of the first significant figure of a number to be arrested with its blank slug opposite the printing line, while any type bar to the right of the first significant figure which has not been selected to print digits from 1 to 9 will rise to its uppermost position to print zero.

Total printing is controlled in a similar manner as far as the printing mechanism is concerned but in this case the printing call magnets 233 are controlled from mechanism associated with the accumulators as shown in Fig. 12. Each gear 202 meshes with a gear 250 having two diametrically opposite brushes 251 attached to it. These brushes are, of course, positioned according to the reading on counter wheel 204. The brushes cooperate with a stationary commutator 252 having segments corresponding to the digits and arranged so that one brush 251 makes contact with a segment corresponding to the digit represented by the counter wheel. Each segment is electrically connected to a corresponding segment on the stationary commutator 253 and a brush 254 rotatable under certain conditions but normally stationary on the zero segment cooperates with the commutator 253.

A total is taken by energizing the accumulator magnet 206 at a time in the cycle which would enter ten on the counter wheel 204 or in other words, rotate it through a complete revolution and bring it back to its original position. As the brush 251 passes the zero segment on the commutator 252 a circuit is established to energize the printing magnet 233 to select for printing the digit corresponding to the total on the particular accumulator element. This operation will be explained in further detail in connection with the explanation of the circuit diagram.

Figure 11:
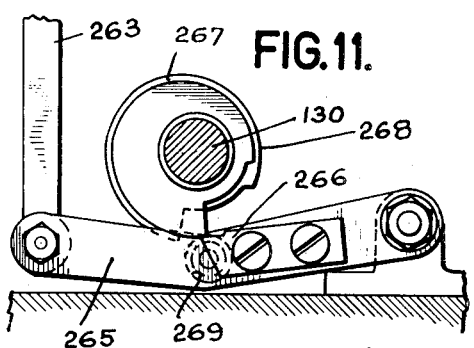
Fig. 11 is a detail of the printing hammer trip mechanism.

Printing is effected from the selected type by hammers 260 operated by a bail 261. A spring 262 tends to rock the bail clockwise to force the hammers against the type but a rod 263 (see also Fig. 11) cooperates with cams on printing shaft 130 to prevent release of the bail until all the type are positioned for printing. The rod or link 263 is pivoted to a lever 265 which carries a nose piece 266 cooperating with a cam 267 fixed to print shaft 130. Shortly after the type bars are properly positioned the nose piece 266 drops quickly to a low portion of cam 267 permitting the bail 261 to operate the hammers to effect printing. Shortly after this a second cam 268 on print shaft 130 encounters a roller 269 journalled on lever 265 and lowers the link 263 to return the bail 261 to inoperative position. A portion of the bail restores the hammers 260.

Figure 10:
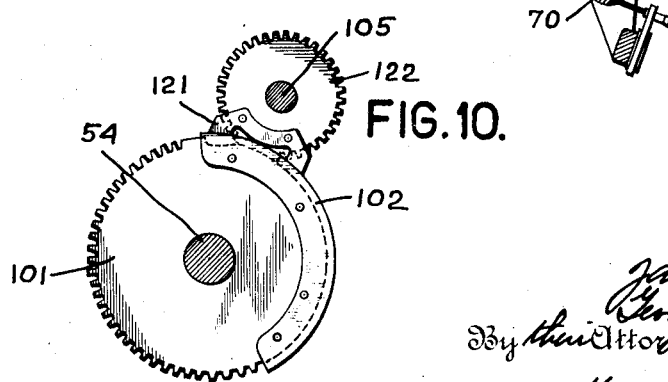
Fig. 10 is a detail of the drive for the reset mechanism.

After the total taking operation the counter wheels 204 may be zeroized, if desired. Referring to Fig. 10, it will be recalled that gear 101 makes a complete revolution during total taking and that during the first portion of this revolution gear 122 fixed to reset shaft 105 rotates but that during the second portion of the revolution it is held stationary owing to the Geneva arrangement 102—121.

The reset shaft 105 through suitable gearing drives a shaft 255 to which the mounting of brushes 254 is fixed. When the brush 254 in its revolution encounters the segment of commutator 253 connected to the segment of commutator 252 on which a brush 251 is resting an impulse is entered into the counter magnet 206 to clutch in the counter wheel and return it to zero. These operations will be more fully explained later.

Subtraction

Subtraction is effected in the present machine in the same manner as in the copending application of J. W. Bryce, Serial No. 222,467, filed September 28, 1927, now Patent No. 1,791,953. Two accumulators are used, one of which receives positive numbers in their true values and complements of negative numbers. The other receives negative numbers in their true values and complements of positive numbers. If a balance is positive, its true value occurs on the first accumulator, while if negative, it occurs on the other. Each number, both positive and negative, is read by the upper or control brushes UB which analyze the cards one cycle previous to their analysis by the lower or adding brushes, and the readings from these upper brushes are entered into translators which convert them into complements and enter them into the proper accumulators in the following machine cycle during which the actual values of the numbers are being read by the lower brushes LB and entered into the proper counters. The mechanical instrumentalities for obtaining the complements of numbers are illustrated in Figs. 7, 13, 14 and 15. As previously explained, the translators are driven by the translator driving shaft 178 whose operation has been explained.

Each translator unit, of which one is provided for each column entering into the subtracting operation, has a single reading-in commutator indicated at 280 (Fig. 7) and four reading-out commutators indicated at 281 and 282 all commutators being driven from the driving shaft 178 through suitable intermeshing gears fixed to the commutators. Each translator unit utilizes two of the reading-out commutators 281 during one cycle to set up a reading while the other two commutators 282 are reading out the complement of a reading received in the previous machine cycle. The two pairs thus alternate, one receiving readings while the other is emitting readings. A single reading-in commutator is utilized as it may be provided with two sets of brushes 283 and 284, one set of which controls the set up of one pair of reading-out commutators and the other set of which controls the set up of the other pair of reading-out commutators during alternate machine cycles.

Figure 15:
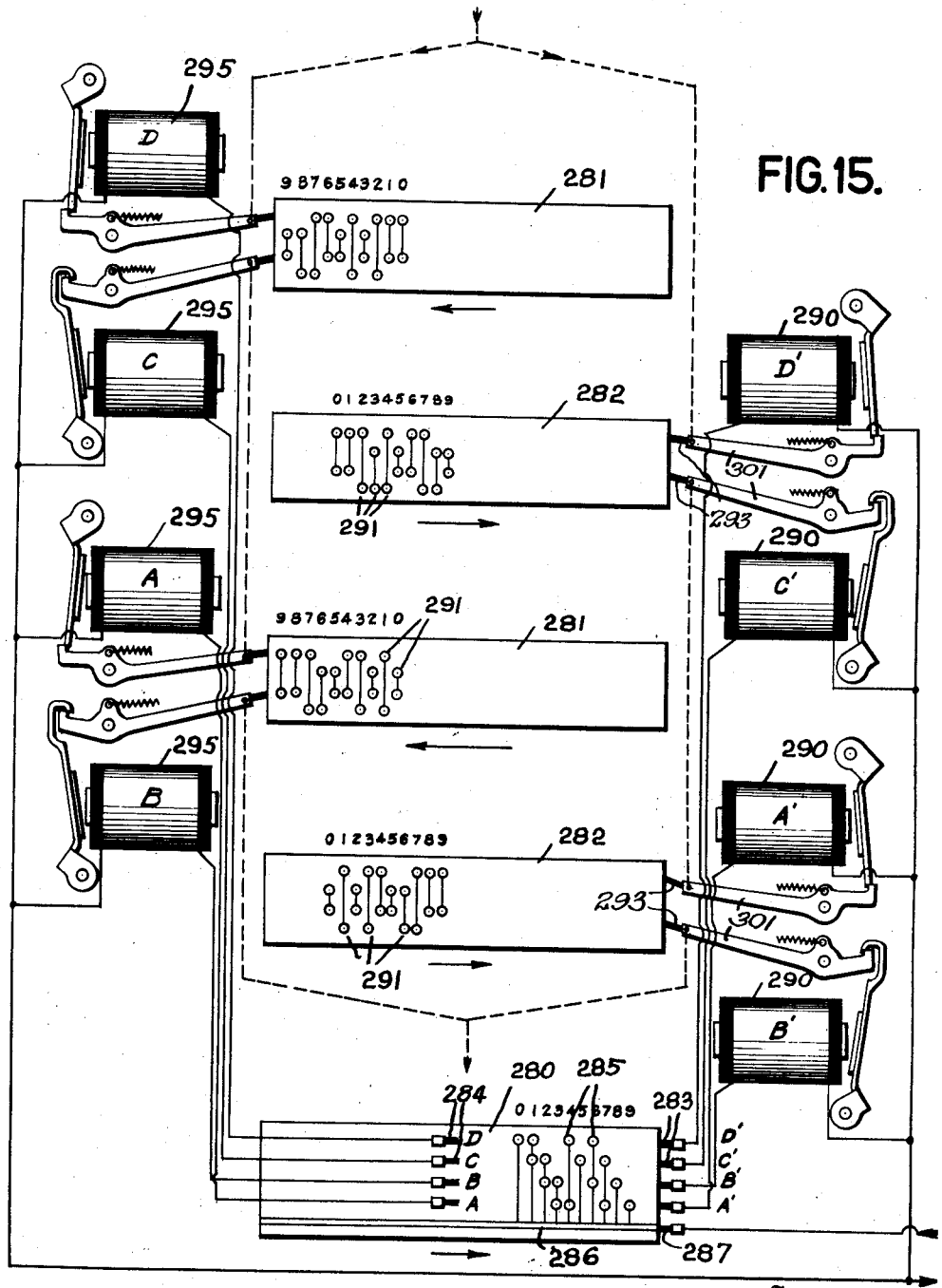
Fig. 15 is a fragmentary circuit diagram illustrating the electrical features of the translators.

The theory of operation of the translator will be clearly understood from Fig. 15. Developments of the several commutators are shown with arrows indicating their direction of movement. The reading-in commutator 280 has a series of conducting spots 285 which are arranged in transverse and circumferential rows. All of these spots are electrically connected to a collecting ring 286 which through a brush 287 is constantly connected to a card analyzing brush UB of the machine. When an analyzing brush UB encounters a perforation a certain transverse row of spots 285 is under one set of brushes 283 or 284 and circuits are completed through these brushes to certain magnets 290 or 295.

The arrangement is such that whenever a perforation in the card is encountered one or more of the magnets 290 or 295 will be energized, the combination of magnets being different for each possible index point on a card. The reading-out commutators are likewise provided with a group of spots 291 which are arranged in ten rows corresponding to the ten digits. Two reading-out commutators 282 operate in conjunction when the spots cooperate with brushes 293 operated by magnets 290. Each brush 293 normally cooperates with a given circumferential row of spots 291 but when shifted cooperates with an adjacent row. The circuit shown in dotted lines extends to the accumulator magnet which is to receive the complement. This circuit includes two breaks represented by adjacent pairs of brushes 293 which breaks may be bridged by the conducting spots 291 on the reading-out commutators 282. The shifting of any brush or brushes 293 results in a current impulse timed according to the complement of the number represented by the record card perforation. Thus if the analyzing brush encounters a perforation in the zero index point position the brushes 293 will shift so that the dotted line circuit will be completed when the transverse row of spots 291 designated "9" encounters the brushes. This provides for entering the "9" complement. The complements of other numbers are entered in a similar manner. Obviously, by merely changing the timing of the commutators 281 other complements may be entered. In the case of the units denominational order which should receive the "10" complement instead of the "9" complement these commutators are timed one point early so that the "10" complement would be entered in this denominational order thus providing for the true or tens complement of the complete number.

During one cycle then the brushes 283 marked A', B', C', D' serve to set up the magnets 290 marked A', B', C', D'; during the following cycle the brushes 293 cooperate with the conducting spots 291 on the reading-out commutators 282 to enter the complements into the accumulators. During this following cycle the brushes 284 cooperate with the spots 285 of the reading-in commutator to set up the other series of magnets 295 for cooperating with the reading-out commutators 281 in a similar manner which thereupon read out in the following machine cycle. Automatic switching arrangements are provided so that the complement of a negative number is entered into one accumulator and the complement of a positive number is entered into the other accumulator as will be hereinafter explained.

The mechanical operation of the reading-out commutators and their controlling magnets is illustrated in Figs. 13 and 14, Fig. 13 showing a brush 293 which has been shifted by the operation of its magnet and Fig. 14 showing a brush which is in normal or unshifted position. The reading-out commutators 282 consist of insulated cylinders rotatably mounted on studs 296 having substantially half of their periphery cut away as indicated and the other half formed with four grooves 297. The brush 293 is unshifted, normally rides in a groove 297 which contains one row of conducting spots 291, but when shifted by its magnet 290 rides in a groove which contains another row of the conducting spots 291. The timing is such that the shifting of the brushes occurs when the cut-away portion of the commutator is opposite them so that they will not be damaged or frayed on a shifting operation.

Each brush 293 is mounted on a pivoted brush holder 301 and a spring 302 tends to force the brush 293 into one groove 297. The brush holder is normally held by the latch member 303 in position to ride in the other groove 297. This latch 303 supports the armature 304 of magnet 290 and is in latching position when the magnet armature is unattracted, being held by a spring 305. When the magnet is energized its armature 304 is attracted, the latch 303 is released and spring 302 shifts brush holder 301 so that brush 293 rides in the other groove as illustrated in Fig. 13. After the shifting, the brush cooperates with the conducting spots 291 during the following card cycle and just after leaving the grooves is shifted back to normal latched position by a cam 306 on the driving gear of the commutator. This cam encounters a pivoted spring-biased lever 307 and forces it against the brush holder 301 to shift the brush holder back into latching position whereupon it is latched by the latch 303, the magnet 290 being deenergized at this time to release its armature.

Automatic control

The machine is provided with mechanisms so that it will remain in adding operation as long as cards of the same classification group are passing through it but will stop or take a total at the end of each card group. This automatic control system is similar to that described in the patent to Lake, No. 1,822,594, granted September 8, 1938, and is illustrated in Figs. 2 and 6. Referring to Fig. 6, a magnet 310 is plugged in series between the upper and lower brushes of the machine for each card column which contains perforations of group designations.

The upper and lower analyzing brushes are spaced so that while the lower brushes are searching the index points of one card the upper analyzing brushes are searching corresponding index points on the following card. As long as the perforations agree in the cards under the upper and lower brushes the magnets 310 are energized at some time during the cycle while, if the group designating perforations fail to agree, one or more of the magnets fails to energize. Each magnet is provided with an armature 311 mounted on a pivoted latch member 312, the latch member being in latching position as shown when the magnet is deenergized but being retracted when the magnet is energized. Each magnet controls a pair of contacts 314 which are normally open. A bell crank member 315 pivoted at 316 has a head engaging a pin on a spring actuated hinged member 313 and a tail piece normally latched by the latch 312. Under these conditions the hinged member is held to permit spring contacts 314 to open under their own resiliency. When the magnet is energized the latch member 312 being retracted releases the bell crank 315 whereupon a spring 313a causes an insulated knob on hinged member 313 to force contacts 314 into engagement. Contacts 314 for all control columns are wires in series to form the automatic control circuit. As long as this circuit is closed at a certain time in the cycle the machine remains in adding operation but when it is open at this certain time the machine ceases adding at the end of the cycle and either stops or takes a total.

When once closed the contacts 314 remain closed until just prior to the end of the cycle when a cam 317 on constantly running shaft 187 encounters an extension on the head of bell crank 315 and restores it to latched position thereby preparing the control circuit for the following machine cycle. The control magnets 310 are arranged in two horizontal rows slightly staggered to preserve space. The lower group operates exactly the same as has just been explained for the upper group.

Circuit diagram

Referring to Fig 16, the electrical energy for operating the machine is obtained from a source S which, when a switch SW is closed, energizes the main lines 400 and 401. The machine is driven by a compound motor M whose armature circuit is connected directly between the main lines 400 and 401 so that the motor drives the machine as soon as the switch SW is closed. The shunt field of the motor includes a resistance 402 which may be shunted by several circuit breakers to govern the speed of the motor. As usual the motor speed should be low whenever a printing operation is to occur and should be high whenever a straight tabulating operation occurs, as in the latter case the heavy printing mechanism need not be operated and tabulating operations may be performed at high speed. The resistance is shunted by a list-non-list switch 403 which is closed when the machine is set for listing operations and opened when the machine is to tabulate, thus providing for low motor speed in one case and high motor speed in the other. The resistance is also shunted by cam contacts 404 which are operated by a cam on the printing crosshead shaft and arranged to close the contacts whenever the crosshead shaft is in operation thus providing a safety device to insure low speed whenever the printing crosshead is in use.

The motor starts to operate as soon as the main switch is closed and its speed should be low as long as it is turning the machine over idly. Normally closed relay contacts 405 are therefore provided to shunt the field resistance. The coil 406 of these relay contacts is in series with the card feed clutch magnet 431 so that whenever the motor is turning idly, that is without concurrent energization of the card feed clutch magnet, the motor speed will be low. Each group of straight tabulating cycles provides for printing a group number from the first card of each group and the motor speed should be low during the first active cycle of each group. This is taken care of by relay contacts GI-2 which also shunt the field resistances of the motor and which are controlled by a relay coil 407 (see Fig. 16A) which is energized to close the contacts GI-2 on any reset cycle and by suitable holding circuits to hold them closed during the first active cycle and open them at the end of this cycle. This group indicating operation is well understood but will be explained more fully hereinafter.

The usual card lever contacts which control certain circuits in accordance with the presence or absence of cards under the card analyzing brushes have been replaced in the present machine by brushes entirely similar in construction and location to the usual analyzing brushes. These brushes will hereinafter be referred to as key brushes and serve to control relays through which any number of contacts may be opened or closed to control the circuits. These key brushes provide a simpler and more certain control than the usual card levers.

Referring to Fig. 16A the upper key brush which is in line with the control brushes but which cooperates with an imperforate portion of the card is indicated at UKB and is in series with a pair of cam contacts F—12 and a split circuit including in one branch relays UKBR #1 and UKBR #2, which control the key brush contacts, and in another branch the relay coil 411, forming a holding relay for the key brush circuit, and the relay coil 412 whose function will be explained later. The key brush UKB coacts with the edge of the card so that the key brush circuit is open at UKB as long as a card is actually under the control brushes and is closed at this point when a card is not actually under the control brushes. The cam contacts F—12 operated by the card feed mechanism are closed only during the adding portion of a machine cycle being opened at other times so that the temporary closure of the circuit at the brush UKB between cards has no effect on the key brush circuit. Whenever the card feed mechanism is in operation and there is no card passing the upper brushes during the normal operating portion of the cycle, the key brush circuit is established from the main line 400 through brush UKB and cam contacts F—12 to the relay coils UKB #1, UKB #2 and 411, 412 to the other line 401. Energization of relay coil 411 closes its contacts 413 and establishes a holding circuit for the several relay coils through cam contacts F—8, also operated by the card feed and which are closed at the normal home position of the card feed mechanism but open shortly thereafter and close again before F—12 open. If, during a certain machine cycle, the upper key brush circuit is energized owing to the absence of a card under the upper brushes, this circuit will be held through the cam contacts F—8 until the beginning of the following cycle.

If a card still fails to pass the brushes during this following cycle the circuit at UKB is closed when F—12 closes and the key brush circuit remains established for this following machine cycle. Now assume that during the next cycle a card passes the upper brushes. As before, the key brush circuit is held by F—8 until the beginning of this cycle but as a card is now passing UKB, holding the circuit open at this point, the opening of cam contacts F—8 breaks the key brush circuit. Normal running conditions are now obtained in the upper key brush circuit and it will not close again until a card fails to feed past the upper brushes. The cam contacts F—12, furthermore, prevent closure of the upper key brush circuit as long as the card feed is not operative.

The lower key brush is indicated at LKB and is in series with cam contacts F—13 which are normally open but close during the active adding portion of the cycle to render the lower key brush circuit inoperative as long as the card feed mechanism is not operated. In series with the lower key brush is a relay coil 415 whose contacts are shown at 416. When the card feed is operating and no card is under the lower brushes contacts 416 are closed thereby energizing relay 417 which controls the contacts corresponding to the usual card lever contacts for the lower or adding brushes. The circuit of this relay 417 extends through card feed contacts F—9 which are closed during the period between cards so that the lower key brush circuit when once established is maintained through a holding circuit from one card cycle to the beginning of the next. The holding circuit is controlled by a relay 421 in series with the contacts 416 which when energized closes its contacts 422 and establishes a holding circuit for the relay 417 to maintain the required position of the contacts.

The timing of card feed contacts F—9 and F—13 is substantially the same as that of F—8 and F—12, respectively, and these contacts serve to control the lower key brush circuits in accordance with the presence or absence of cards under the lower brushes just as contacts F—8 and F—12 control the upper key brush circuits.

The group indicating circuits whose function is to make certain mechanisms operative during the first active cycle only of each card group when the machine is set for straight tabulating are shown in the upper portion of Fig. 16A. The coil 407, previously refered to in connection with motor speed control, is in series with a relay coil 424 whose contacts GI—1 are in the circuit of a print clutch magnet 434 in Fig. 16. Both coils are energized when the machine makes a reset operation through cam contacts R—6. During the reset cycle, the card feed contacts F—7 are closed and the GI coils 407 and 424 are energized through a circuit extending from line 400, cam contacts F—7, contacts R—6 through the coils 424 and 407 to the line 401. The GI holding coil 425 is in parallel with coils 407 and 424 and is energized at the same time, establishing through its contacts 426, a stick circuit for the coils 407, 424 thus maintaining the GI coils energized for one complete machine cycle. Under normal running conditions the holding circuit is interrupted at the end of the first cycle by the opening of cam contacts F—7. The lower key brush contacts LKB #3 controlled by the lower key brush relay 417 are normally open but closed when a card is not under the lower brushes and the card feed is operating. These contacts LKB #3 serve to hold the GI coils energized over the first few machine cycles before cards are fed from the magazine beneath the lower brushes. Toward the end of the card feeding cycle when the first card has reached the lower brushes, reopening contacts LKB #3, the opening of cam contacts F—7 breaks the GI holding circuit whereupon this circuit remains deenergized until the next reset operation.

The card feed mechanism as previously explained is controlled by a magnet 431 which operates the card feed clutch (Fig. 16). The total taking mechanism is operated by a magnet 432 which controls the total clutch. The reset mechanism is controlled by magnet 433 which controls the reset clutch and the printing mechanism is controlled by magnet 434 which controls the printing clutch. These magnets may be called into operation either singly or in combinations to effect the operation of each of the mechanisms either by itself or in combination with the other mechanisms. On straight tabulating operations after the first cycle the card feed alone should be operative. On listing operations the printing mechanism as well as the card feed should be in operation and under these conditions magnet 431 as well as magnet 434 must be energized. Also all total taking operations require the coordination of the printing mechanism and for totaling operations magnet 432 as well as magnet 434 must be energized. The card feed magnet 431 may be initially energized by closing the start key contacts ST whereupon a circuit is established from the line 400 through speed control relay magnet 406 previously referred to and card feed clutch magnet 431 to start key contacts ST thence through motor control contacts 435 whose operation will be explained later, stop key contacts S and a pair of interlocking contacts T—25, R—25 to the other side of the line 401. The interlocking contacts T—25 serve to open this card feed circuit during totaling and the contacts R—25 serve to open it during reset thus making additional provisions for preventing operation of the card feed during total and reset cycles.

Energization of the card feed clutch magnet 431 closes contacts 436 which prepare a shunt around the start key contacts ST, this shunt including contacts F—1 which close shortly after the card feed starts in operation thus maintaining the card feed in operation for complete card feeding cycles. A second shunt circuit through the contacts 436 extends through the lower key brush contacts LKB #1 which are normally closed but opened by the lower key brush relay whenever the card feed is operating and no card is under the lower brushes. This circuit maintains the card feed in operation when it is once initiated as long as cards are passing the lower brushes and as long as the motor control relay coil controlling contacts 435 and which is controlled from the automatic control system remains deenergized. It may be noted at this point that if a stack of cards has just been placed in the card magazine the start key must be held down or repeatedly depressed until the first card reaches the lower brushes permitting contacts LKB #1 to close.

Provision is made for restarting card feed automatically after each reset operation by switch 437. When this switch is open as shown in the drawings the card feed after being once interrupted can only be restarted through the start key contacts ST but if this switch is closed cam contacts R—1 which close toward the end of the reset operation establish a circuit for the card feed clutch entirely similar to that just described for the start key.

The total clutch magnet 432 may likewise be called into operation either manually or automatically. The circuit for closing it manually extends through the normally closed stop key contacts S—1 and manually operable total contacts U—1 to the other side of the line through cam contacts R—3 and F—3. The latter serve as interlocks to prevent the operation of the total mechanism during card feeding and resetting operations. After the total taking mechanism starts in operation the key contacts U—1 are shunted by contacts 441, operated by the total clutch magnet 432, to establish a circuit through the cam contacts T—2 in parallel with the contacts 442 of the auto total relay 457 which is under control of the automatic total taking mechanism. The automatic control circuit provides for closing contacts 442 as long as total taking operations are to continue as will be explained later. Contacts T—2 tend to interrupt the operation of the total taking mechanism each total cycle and during the first total taking cycle in which the contacts 442 are open the operation of the total cycle will be interrupted by them. Provision is made for instituting automatic total taking at the end of card groups through manual switch 443 which, when closed, places the total clutch magnet 432 in series with card feed contacts F—2 and auto total relay contacts 442. The contacts F—2 close toward the end of each card feed cycle and whenever the contacts 442 are closed at this time which will be the case when the following machine cycle is to be a total taking one the total clutch magnet 432 will be energized in a manner entirely similar to that just explained for the manual push button contacts U—1.

The reset mechanism controlled by the reset clutch magnet 433 may also be called into operation either manually or automatically. The reset push button contacts R establish a circuit for the clutch magnet 433 directly between the lines 400 and 401 the circuit including locking cam contacts T—4 and F—4 which prevent the operation of the reset mechanism when either the total taking mechanism or card feed mechanism is in operation. Instantaneous closing of the contacts R is sufficient to cause the reset mechanism to operate for a complete cycle as the energization of the coil 433 closes contacts 444 which shunt the contacts R through cam contacts R—4 operated by the reset mechanism and serving to hold the clutch magnet energized throughout a complete cycle and interrupt its operation at the end of the cycle. The reset mechanism may be called into operation automatically by means of a manual switch 445 which when closed throws the clutch magnet in series with contacts T—3 and auto reset relay contacts 446. The latter are controlled from the automatic control circuit and are held open during total taking operations and closed toward the end of the last total taking cycle as will be later explained. The cam contacts T—3 close instantaneously toward the end of each total cycle and, during the last total cycle, which is the first in which the contacts 446 are closed, the reset clutch magnet 433 is energized to institute reset.

The printing mechanism must be called into operation through its printing clutch magnet 434 under several different conditions. This mechanism must be effective during all listing and totaling operations and in addition during the first card feed cycle of each group when the machine is set for straight tabulating.

If the list-non-list switch 447 is closed, the printing clutch magnet will be energized by contacts FO closed by the card feed clutch, contacts TO closed by the total clutch, and contacts RO closed by the reset clutch so that either a card feeding, total taking or reset operation will cause the printing mechanism to operate. In the case of reset, no actual printing occurs because R—15 (Fig. 16D) opens the total print circuit but the mechanism is called into operation to insure an extra paper feed at the end of reset thus providing a space between the several groups of items as printed. It will be recalled that the paper feed mechanism is operated directly from the printing mechanism. In the absence of the operation of the card feed mechanism, the total taking mechanism or the reset mechanism, the printing clutch 434 may be called into operation manually by closing push button contacts U—2. Energization of the clutch magnet instantaneously through any of the above devices causes it to close contacts 451 establishing a shunt circuit about the initiating circuit through card feed contacts F—6 in series with lower key brush contacts LKB #2, normally closed and open when no cards are passing the lower brushes, and contacts R—5 normally closed and operated by the reset mechanism. The contacts F—6 open toward the end of each card feed cycle so that unless the initiating circuits are established anew the total print clutch will be deenergized at the end of the cycle. These contacts are normally closed, however, so that during total taking operations when the card feed is not operating the printing clutch tends to remain energized.

During the last card group after the last card in the group has passed the lower brushes, contacts LKB #2 open and on the ensuing reset cycle which follows the total taking operation, the opening of contacts R—5 will interrupt the circuit of the print clutch magnet 434 preventing useless operations of the printing mechanism after the cards are exhausted from the magazine.

On a change in card group when the manual switch 447 is open signifying that the machine is on straight tabulating or non-listing operation, the operation of the automatic control to call for total taking, effects closure of the contacts 452 to start the printing mechanism into operation, these contacts being in parallel with the manually operated contacts U—2.

During the first cycle of each card group in which the tabulator is engaged in straight tabulating or non-listing, the printing clutch magnet is energized to provide for group indication printing. During normal running conditions when the machine is in operation and cards are under the upper and lower brushes the print clutch circuit remains energized from the total taking operation which occurs at the end of each card group. After total taking the print clutch circuit remains energized through cam contacts F—6 normally closed and lower key brush circuits LKB #2 normally closed. Towards the end of the first card feed cycle of the new group contacts F—6 open and break the print clutch circuit which is not closed again until another total taking operation occurs. On occasions when cards have just been placed in the card magazine, the first active cycle is the third machine cycle as during the first two the first card in the magazine is feeding into position beneath the adding brushes.

In this case contacts GI #1 remain closed for three cycles. During the first machine cycle upper key brush contacts UKB #1 are open preventing energization of the print clutch magnet 434. During the second cycle contacts UKB #1 close, as a card has now reached the upper brushes but card feed contacts F—5 remain open until after the adding portion of the cycle preventing energization of the magnet clutch during the active portion of the cycle. At the end of this cycle, card feed contacts F—5, on closing, temporarily energize the print clutch magnet. The circuit now shifts through cam contacts F—6 which are normally closed but which break temporarily after the adding portion of the cycle but prior to the closure of cam contacts F—5. The print clutch magnet 434 therefore remains energized during the third machine cycle to permit group indication printing. It is deenergized at the end of the third cycle by the opening of cam contacts F—6, the contacts GI #1 having opened at this time to prevent energization of the print clutch magnet through the original circuit.

The GI #1 contacts must remain closed during the first three cycles just described but must open at the end of these cycles. As previously explained (Fig. 16A) the GI coil 424, controlling contacts GI #1 is energized during a reset cycle which is always effected before tabulating a new card group. When card feed starts, no card having yet reached the lower brushes, contacts LKB #3 close to bridge cam contacts F—7 when the latter open during the first two cycles. The first card reaches the lower brushes during the third cycle and consequently contacts LKB #3 remain open whereupon the opening of cam contacts F—7 towards the end of this cycle deenergizes GI holding coil 425 and open contacts GI #1. The GI circuits after this can only be reestablished by a reset operation.

*Automatic control*

The machine is provided with a major, intermediate and minor automatic control of the type fully disclosed and claimed in the copending application of Bryce No. 227,127, filed October 19, 1927 now Patent No. 1,933,308. The automatic control magnets 310 (Fig. 16B) of which a plurality are provided may be plugged in series between upper and lower analyzing brushes UB and LB in columns from which it is desired to control. The controlling cards pass the lower analyzing brushes LB exactly one cycle after they pass the upper analyzing brushes UB so that when the control magnets are thus plugged each of them will receive an impulse at some time during the cycle if the controlling perforations in the cards under the upper and lower agree but will receive no such impulse if the cards disagree, indicating that the card under the upper brush belongs to a new group. The energization of any magnet 310 closes corresponding contacts 314 and as previously explained these contacts when closed remain closed until the end of the card cycle when they are reopened by mechanical means. The several contacts 314 are wired in series and sockets 455 are provided between adjacent pairs of contacts to permit plugging of the auto control circuit. The motor control relay 456 whose function is to stop the machine at the end of a card group controls the contacts 435 (Fig. 16) whose operation has been previously explained in connection with the card feed clutch magnet. This relay coil together with the auto total relay coil 457 which operates contacts 442 for controlling the total print clutch magnet (Fig. 16) and cross head control relay 458 whose contacts 452 control the print clutch magnet for total printing and the auto reset relay 459 which operates contacts 446 for controlling the reset clutch magnet in the manner previously described, are all energized concurrently, all being under the control of a group of three relay contacts 461, 462 and 463 (Fig. 16B).

These relays are controlled by coils 464, 465, and 466 respectively, in such manner that back contacts 461B, 462B and 463B are closed when the magnets are deenergized. The back contacts are in parallel with each other and in series with the coils 456, 457, 458 and 459 so that whenever any one of these relays is deenergized, energization of coils 456, 457, 458 and 459 tends to interrupt card feed, call the total taking and printing mechanisms into operation, and effect reset after the last printing operation.

The function of the auto control system is to maintain the coils 464, 465 and 466 energized holding their back contacts open as long as the card group does not change. The major control relay 464 is connected to a knife switch 467, the intermediate relay 465 is connected to a knife switch 468 and the minor control relay 466 is connected to a knife switch 469. The provision of the major, intermediate and minor control is so that the control designation on the cards may be divided into three sections arranged in different columns which gorups bear the relationship of major, intermediate and minor to each other. A change in the major group is instrumental in causing the totals corresponding to all three sections to be taken. A change in the intermediate group causes totals to be taken from accumulators corresponding to the intermediate and minor control sections but not the accumulators corresponding to the major section. A change in the minor section causes totals to be taken from accumulators associated with the minor control sections only.

When more than one type of total is to be taken, as for example, major, minor and intermediate, the machine is arranged to perform successive total operations, minor totals being taken in one machine cycle, intermediate in the next and major in the next, the number of total taking cycles, however, being limited to the actual number of totals to be taken. Thus a change in the major group designation initiates three total taking cycles, a change in the intermediate section two total taking cycles, and a change in the minor section only one.

When the knife switch 467 connected to the major control relay is thrown to the dotted line position as shown in the drawing it connects the major control relay to a socket 471 through a wire 467a from which it may be plugged between any pair of contacts 314. In the drawings, plugging is completed to socket 455 between the third and fourth groups of contacts 314 in which case the first, second and third contacts 314 are being utilized for major control. With the switch 468 in the dotted line position the intermediate control relay 465 may be plugged from socket 472 to a socket 455 to select other contacts 314 for the intermediate control. Plugging is indicated to select contacts 314 from No. 4 to No. 16 as intermediate control contacts. The minor control relay 466 is plugged through knife switch 469 in dotted line position to the contacts 314 No. 20. The contacts 314 No. 1 may be connected to line 401 through upper key brush contacts UKB #2. With the plugging as shown, cam contacts F—14 are in parallel with the major control contacts 314, cam contacts F—15 are in parallel with the intermediate control contacts and cam contacts F—16 are in parallel with the minor control contacts.

Contacts F—14, F—15 and F—16 are in turn shunted by lower key brush contacts LKB #4, LKB #5 and LKB #6 respectively. The purpose here is to prevent the operation of the automatic control circuit during the first few machine cycles after cards have just been placed in the magazine. The lower key brush contacts close as soon as the card feed operates without cards under the lower brushes. They then shunt out the automatitc control contacts until the first card reaches the lower brushes. When the first card reaches the lower brushes, the lower key brush contacts open, rendering the automatic control effective. The contacts F—14, F—15 and F—16 are normally closed but open instantaneously toward the end of each card feed cycle. If at the time they are open corresponding contacts 314 are all closed, the relays 464, 465 and 466 remain energized but if at the time they open one or more of the contacts 314 is open, the circuit through one or more of the relays 464, 465 and 466 will be opened, deenergizing this relay and causing its back contacts to close, thereupon energizing the motor control relay 456 as previously explained.

Assuming that the major, intermediate and minor relays are thus deenergized they may only be reenergized through cam contacts T—9, T—10 and T—11 respectively which close in the order named during each total taking cycle, each pair of contacts closing and opening before the next in order closes. During the first total taking cycle closure of the contacts T—9 and T—10 has no effect, as the set up circuit for the intermediate control relay 465 extends through the front contacts 463F of the minor relay and the set up circuit for the major relay 464 extends through the front contacts 462F of the intermediate relay 465. Closure of contacts T—11 toward the end of the first total taking cycle reenergizes the minor control relay 466 the circuit extending from line 400 through cam contacts T—11, minor control relay 466 to binder post 491, thence through cam contacts F—16, F—15 and F—14 to the other line 401.

Toward the end of the second total taking cycle the closure of cam contacts T—9 has no effect but the closure of cam contacts T—10 reestablishes the set up of the circuit for the intermediate control relay 465, this circuit extending from line 400, through front contacts 463F of the minor control relay, contacts T—10, thence through intermediate control relay 465 and binder post 492 through cam contacts F—15 and F—14 to the other side of the line 401. During the third total taking cycle the closure of the cam contacts T—9 sets up the major control relay 464 in a similar manner, the circuit in this case extending through the front contacts 462—F of the intermediate control relay. The circuit including cam contacts T—9 and major control relay 464 includes an extra pair of major control contacts 493 which are controlled by a coil 494 in the intermediate control set up circuit. The purpose of these contacts is to prevent undesired set ups of the intermediate control relay during the first total taking cycle when a break has occurred in the intermediate section of control deenergizing intermediate and minor control relays but allowing major control relay 464 to remain energized. In this case the closure of contacts T—9 during the first total taking cycle would tend to set up the intermediate control relay through the front contacts 461—F of the major control relay. This is prevented by the contacts 493 which are opened as long as the intermediate relay is deenergized. They do not interfere with the setting up of the major control relay because whenever the latter is set up the intermediate control relay is energized, closing contacts 493. Only after the minor, intermediate and major control relays have thus been set up will the circuits through the coils 456, 457, 458 and 459 be interrupted to permit the machine to resume operations other than totaling.

It will be noted here that as soon as all three relays 464, 465 and 466 are energized the coils 456, 457, 458 and 459 are deenergized. If coil 466 alone is deenergized only one machine cycle is required to set it up. If coils 466 and 465 are deenergized two cycles are required and if all coils 466, 465 and 464 are deenergized three cycles are required to complete the set up. After the last card has passed the lower brushes, it is desirable that the machine take all three totals just as if a split had occurred in the major, intermediate and minor sections. This is effected by the opening of the contacts UKB #2 which open and break the control circuits to deenergize all the control relays 464, 465 and 466 after the last card has fed through the magazine and passed the upper analyzing brushes. During the following cycle when the card is passing the lower brushes the automatic control circuit remains open.

The effects of the automatitc control system when operating on major, intermediate and minor control on card feed, total taking and reset may be summarized in connection with Fig. 16. In regard to card feed the motor control relay coil 456, which controls contacts 435, is energized at the end of any cycle in which the control circuit breaks in any section and remains energized until after the number of total taking cycles called for by the particular operation of the automatic control system is completed. The energization of the motor control relay coil 456 opens contacts 435 which deenergizes the card feed clutch and interrupts card feed. These contacts remain open until all total taking operations are complete and until then, the card feed clutch magnet cannot be energized to start card feed. If the auto start switch 437 is closed, the closure of cam contacts R—I towards the end of reset operation, which occurs after the last total taking cycle when the contacts 435 have also closed, again energizes the card feed clutch magnet and starts the card feed for the following group.

The total taking clutch, assuming that auto total switch 443 is closed, will be energized by the closing of cam contacts F—2 towards the end of the last card feed cycle when contacts 442 have been closed owing to the energization of auto control relay coil 457 (Fig. 16B) due to the break in the control. Contacts 442 remain closed until the automatic control circuits have been reestablished which occurs during the last total taking cycle. At this time contacts 442 open and cam contacts T—2 interrupt the circuit of the total clutch magnet 432 at the proper time during the last totaling cycle.

Contacts 446 are opened by the auto reset relay coil 459 when the control breaks and remain open until toward the end of the last total taking cycle. Assuming that switch 445 is closed, during the last total taking cycle, when cam contacts T—3 close toward the end of the cycle, the reset clutch magnet 433 is energized. When the magnet 433 is energized it closes contacts 444 and shunts cam contacts T—3 nd contacts 446 through relay cam contacts R—4 which maintain the reset clutch magnet 433 energized for a single cycle and then deenergizes it.

The print clutch magnet 434 must be energized during the total taking cycles to effect total printing. This magnet is energized by closure of contacts 452 controlled by the crosshead control relay coil 458, which is energized when the automatic control breaks, and until the control circuits are reestablished at the end of the last total taking cycle.

As will be understood from the previous explanation of the mechanical total and reset mechanism, the reset operation is entirely distinct from the totaling operation. In case of a break in the major control the totals will be taken in succession and then a single reset operation serves to reset all accumulators which it is desired to reset. This is accomplished through a series of circuits shown in the upper section of Fig. 16B. The mechanism for controlling total and reset of the major section is controlled from a socket 494a, that for the intermediate total and reset from socket 495 and that for the minor total and reset from socket 496 which mechanisms are controlled from the automatic control circuits as will now be explained. These circuits are fed from the line 400, through cam contacts R—11 which are normally closed but open temporarily toward the end of a reset cycle. When the minor control relay 466 is energized two coils 497 and 498 are likewise energized, the first serving to open contacts 501 and the latter serving to close contacts 502. During the first total taking cycle when the minor control relay 466 is deenergized the contacts 501 are closed. These contacts are in series with a group of contacts T—12 whose upper pair closes from the nine to zero position during totaling and both whose upper and lower pairs close temporarily after the zero position. The closure of the upper pair of contacts T—12 establishes a circuit from line 400 through cam contacts R—11, contacts 501, upper contacts T—12 and upper contacts R—12 (normally closed) to socket 496. This circuit, thus closed during the first total taking cycle is utilized to control the mechanism for tne minor total taking. After the minor totals are taken the closure of the lower contacts T—12 serves to energize a minor reset relay 503 closing stick circuit contacts 504 which establishes a circuit from line 400 through contacts 504 and relay coil 503 to line 401 and an auxiliary circuit to lower contacts R—12.

These lower contacts R—12 remain open during all total taking cycles but close when the reset operation commences, thereby furnishing power for the control mechanism of the minor reset. The intermediate total is taken in a similar manner by control through contacts 505 operated by a coil 506 in parallel with the intermediate control relay 465 and by contacts 502 controlled by the coil 498 in the minor control circuit. The major total and reset is controlled by contacts 511 operated by a coil 512 in parallel with the major control relay 464 and by contacts 513 operated by coil 514 in the intermediate control circuits. After all totals have been taken, the reset mechanism is called into operation closing lower contacts of groups R—12, R—13 and R—14 connecting main line 400 to the sockets 494a, 495 and 496 to furnish power for reset. Towards the end of the reset operation cam contacts R—11 open temporarily to deenergize the holding circuits, restoring the circuits to normal position.

The automatic control system may be arranged so that only a single section of control is provided for, in which case a single total taking cycle results on a change in group number, or so that two sections of control are provided for, in which case a change of group in the lower section effects a single total taking cycle and a change in the higher section effects two total taking cycles. The plugging and switch arrangement for a single section of control is illustrated in Fig. 21 and that for a double control is illustrated in Fig. 20. The operation of the machine when plugged in either of these manners will be obvious from the previous explanation of the three section control.

Adding and listing

Referring to Fig. 16D the accumulator magnets are shown at 206 and the printer magnets at 233. The operation of these magnets, when energized to accomplish adding and printing, has already been explained and the method by which they are energized from the lower analyzing brushes LB of the machine will now be explained. The lower analyzing brushes are illustrated at LB, each being connected to a triple socket 520 through which it may be plugged to any desired accumulator. The brushes cooperate with a common contact roll 521 which is connected with the main line 401 through cam contacts F—17 and adding relay contacts 522. The contacts 522 (see Fig. 16A) are controlled by a relay coil 523 in series in the lower key brush circuit.

The contacts are normally closed but as previously explained, when the card feed is in operation closing contacts F—13, and there are no cards under the lower brushes, the lower key brush circuit is energized causing coil 523 to open contacts 522. As soon as a card feeds beneath the lower brushes LB the lower key brush circuit is interrupted at the key brush and the coil is deenergized, permitting contacts 522 to again close. This prevents establishment of adding circuits through the lower brushes of the machine unless cards are feeding and a card is actually under the lower brushes. The cam contacts F—17 operate during card feeding cycles and are closed only during the entering portion of each cycle opening to interrupt the analyzing brush circuits between successive cards. The controlling cards feed between the lower brushes LB and contact roll 521 whereupon each perforation in the card causes the analyzing brushes to momentarily engage the contact roll 521 to furnish the operating impulse for the accumulator and printing magnets 206 and 233. Each lower brush may be plugged to any desired accumulator and to any desired printer. Sockets 524 are connected with the accumulator magnets 206 through commutators 73 which as previously explained operate only during card feed and contacts 525 are similarly connected to the printing magnets 233. Each printer magnet and each accumulator magnet thus has a separate socket through which it may be individually plugged to any lower brush. This permits each lower brush to be plugged to any accumulator magnet and to any printing magnet regardless of whether the accumulator and printing magnets are ordinarily associated together.

In addition a split socket 526 is provided having a portion connected to socket 524 and a portion connected to socket 525, these portions being insulated from each other. The insertion of a plug into the socket 526, however, serves to connect both the accumulator magnet and a corresponding printer magnet in circuit with the same lower brush. If printing alone is desired from a certain brush, the brush would be plugged to socket 525 while if addition alone were desired from a certain brush, this brush would be plugged to socket 524. On the other hand, if both addition and printing are desired, the brush could be plugged to socket 526. In a straight tabulating operation not involving listing the brushes would ordinarily be plugged to sockets 524 and in this case the list-non-list switch 447 in series with the printer clutch magnet 434 (see Fig. 16) should be opened to prevent operation of the printing mechanism. As usual when the lower brushes are plugged to the accumulator and printing magnets the differentially timed impulses effected from the perforations in the cards energize the accumulator and printing magnets at the proper times to enter and print the items represented by the perforations.

Transfer

The mechanical details of the transfer system have been previously described and their electrical effects will now be explained in connection with Fig. 16D. Each accumulator wheel when it passes through zero during a cycle closes a knife switch 222 by means of a cam 222a and when it stands at the nine position, bridges brushes 220 by means of a commutator 220a fixed to the accumulator wheel and provided with a single segment properly placed for this purpose.

When the card feed is operating cam contacts F—18 close instantaneously during each cycle after the adding portion to supply a transfer impulse to one contact of each of the knife switches 222. When transfer is to be effected between the units and tens and between the tens and hundreds accumulator the transfer mechanism of the units order is plugged from a socket 528 to sockets 529 and 530. Socket 529 is connected to the accumulator magnet 206 of the tens order through a commutator 225 on the accumulator drive shaft 75. Socket 530 is connected to the brushes 220 of the tens order transfer device. In like manner, if transfer is to be provided for between the tens and hundreds orders, similar plugging must be effected between these orders as indicated by dotted lines. Assuming that the units order accumulator wheel has passed through ten during a cycle, to close its switch 222, and that the tens order wheel stands at nine, causing bridging of its brushes 220, the transfer operation will be effected as follows: cam contacts F—18 close during the cycle but the impulse from these contacts is accurately timed by means of the commutators 225 whose segment bridges the cooperating brushes instantaneously to properly time the impulse to add one on the accumulator. The transfer from units to tens will be effected from a circuit extending from main line 401, cam contacts F—18, knife switch 222 of the units order to socket 528, thence to socket 529 of the tens order and through commutator 225 to accumulator magnet 206 of the tens order, thus energizing the tens accumulator magnet causing it to add one on its accumulator wheel. From the socket 528 the circuit branches to socket 530, brushes 220 of the tens order and thence through wires 529' and 530' to socket 531 of the hundreds order, thence through plug connections of commutator 225 to accumulator magnet 206 of the hundreds order.

A direct transfer from the units to the tens order has thus been effected and a transfer on a transfer from the tens order to the hundreds order. It will be obvious that by plugging sockets 528, 531 to different units, banks consisting of any desired accumulator units may be formed.

*Total and reset*

Referring to Fig. 16D it will be recalled that the brushes 251 cooperating with commutator 252 are geared to the accumulator wheels and are thus positioned on the several commutator segments according to the reading on the accumulator wheel. Total taking is initiated by supplying an energizing impulse to the accumulator magnets, so timed as to cause them to make a complete revolution or enter ten units. The energizing impulse is effected by the commutator 86 which is driven by the total taking mechanism. Coincident with the impulse the type bars begin to rise in synchronism with the movement of the accumulator wheel. In the meanwhile, brush 254 cooperating with commutator 253 remains stationary on the zero segment of this commutator. Thereupon when brush 251 reaches the zero segment of commutator 252 which is connected to the zero segment of commutator 253, the total print circuit is completed as follows: from line 401, through cam contacts T—16 closed during the total print operation, thence through wires 540 and 541 to brush 254, through the zero segment of commutator 253 to the zero segment of commutator 252 and through brush 251 as it passes the zero segment to socket 542. Socket 542 is of the split type as indicated but when no plug is inserted its two halves are in electrical engagement and continue the circuit through total print commutator 90 and wire 543 to print magnet 233. This impulse is properly timed to select for printing the type corresponding to the reading of the accumulator wheel at the beginning of the total taking operation.

This will be clear from a specific example. Assume that the accumulator wheel registers 8. When the total taking impulse occurs, the type bar passes from normal home position to nine printing position as the brush 251 passes from the eight to the nine segment of commutator 252. The type bar passes from the nine to the eight printing position as the brush 251 passes from the nine to the zero commutator segment. At this time the circuit is completed as just explained selecting the eight type for printing. Owing to the synchronous operation the proper type will always be selected for printing in a similar manner. It will be understood that at the end of this total printing operation the reading on the accumulator wheel and the position of brush 251 is the same as it was before the total print. Also at the end of the total printing operation cam contacts T—16 re-open and remain open.

A reset operation may now be instituted. Cam contacts R—15 are driven by the reset mechanism and close during the reset operation. As previously explained, the reset operation causes the brush 254 of commutator 253 to rotate and incidentally the continually running drive shaft for the counters is rotating. When the brush 254 reaches the segment corresponding to that on which brush 251 of commutator 252 is resting, a circuit is completed through the accumulator magnet as follows: from line 401, through cam contacts R—15, wires 540 and 541, brush 254, segment of commutator 253 to corresponding segment of commutator 252 and through brushes 251 to socket 542, thence through reset commutator 112 to accumulator magnet 206 and to the other side of the line 400.

This impulse is timed to enter the tens complement of the reading on the accumulator and bring it back to zero position. This is because the brush 254 starts its rotation at a time corresponding to the ten point of accumulator operation. The accumulator does not start, however, until the brush 254 reaches the segment corresponding to that on which brush 251 is resting. After this the accumulator starts in operation to enter complements of ten and return to zero.

Totals are distinguished from items on the record sheet by printing asterisks opposite them in the usual manner and for this purpose two asterisk printing bars are provided one at each end of the printing bank. These type bars are controlled by print magnets 233a shown in the lower left hand corner of Fig. 16D. The magnets 233a are each in series with normally open cam contacts T—17 which close instantaneously during each total taking cycle to arrest their type bars in asterisk printing position.

It may also be mentioned at this point that during total taking and reset operations, in both of which the accumulator wheels must pass or reach zero position, the transfer circuit is ineffective as cam contacts F—16 (Fig. 16D) which furnish the transfer impulses are open except during card feed cycles.

*Selecting relay system*

The machine is made universally flexible in its operation by the provision of certain multiple contact relays whose coils are shown at 544 (Fig. 16A) having one terminal connected to the line 401 and the other terminal connected to a socket 545 through which it may be plugged to different control devices. Each of these relays is provided with a plurality of contacts shown at 546 (Fig. 16D) which are normally opened but close when the corresponding relay coil is energized. Each pair of contacts 546 is connected to a split socket 547 which by means of suitable plugs may be connected to split socket 542 in the total print circuit of the accumulators. When so plugged the contacts 546 are in series in the total print and reset circuit and this circuit can only be completed when contacts 546 are closed. If now the sockets 545 (Fig. 16A) of a coil 544 are connected to the reset mechanism and corresponding contacts 546 are connected in the totaling and reset circuits of a particular accumulator, this accumulator will reset on each resetting operation which causes the energization of the coil 544. In like manner the coil 544 may be plugged to the total taking mechanism so that the particular accumulator will take a total whenever the machine performs a total taking operation, or if desired, the coil may be plugged to the major, intermediate or minor group control devices so that the accumulator in question will only print totals and reset when a major, intermediate or minor total is taken.

The straight total and reset control is shown in the lower left hand portion of Fig. 16A. Cam contacts R—7 which close only during reset operations are connected through switch 550 to sockets 551 whereupon, if sockets 551 are plugged to socket 545 of the coil 544, and switch 550 is closed, each resetting operation will cause the accumulator connected to the contacts of coil 544 to reset whenever a resetting operation occurs. Total taking is controlled in like manner from cam contacts T—7 which close during each totaling operation, these cam contacts being connected to the switch 552 which in turn is connected to sockets 553. Sockets 551 and 553 are connected together by a bridging wire 554. Thus if any coil 544 is plugged into a socket 551 the corresponding accumulator may be caused to reset alone if switch 550 is closed and 552 opened, to total without reset if switch 550 is open and 552 is closed, and to both total and reset if both switches 550 and 552 are closed. This mechanism is duplicated in the cam contacts T—8 and R—8 in order that a plurality of accumulators may be differently controlled through the relays 544.

In order to make the total taking and resetting operation under control of the contacts T—7 and R—7 clearer the circuits involved have been assembled on a common sheet (Fig. 17) omitting all circuits not directly involved in this operation. Referring to Fig. 17 the lower brushes LB are plugged to the accumulator magnets 206 and the printer magnets 233 so that adding and listing may be effected in the usual manner. The sockets 542 within the total taking and reset circuits of the accumulator units are plugged to the contacts 546 of coil 544. The socket 545 of coil 544 is connected to the socket 551.

After a plurality of entries have been made into the accumulator from the lower brushes, a reset operation may be initiated. This will cause cam contacts R—7 to close and (switch 550 being closed) a circuit will be completed through coil 544 in turn effecting closure of contacts 546. The reset control circuit will therefore be completed at the proper time from line 401, cam contacts R—15, commutators 253 and 252 to sockets 542, thence through contacts 546 and reset commutator 112 to the accumulator magnet 206. This would cause the accumulator to reset without total taking which would be desired if a wrong result had been accumulated through inadvertence. On the contrary, if switch 550 were open and switch 552 closed, the coil 544 would be energized only during total taking operations and the accumulator would print a total without resetting. Closure of both switches 550 and 552 would cause the coil 544 to be energized both when the reset cam contacts R—7 and the total taking contacts T—7 close whereupon this particular accumulator would print a total and reset whenever the machine performed these operations.

A simplified diagram similar to that shown in Fig. 17 but arranged so that the coil 544 may control an accumulator for major, intermediate or minor totals, is shown in Fig. 18. The major and minor control mechanism shown in the lower part of the figure is identical with that shown in Fig. 16B of the general circuit diagram. It will be recalled from the previous explanation of major, intermediate and minor totaling operation that a circuit is completed through the several cam contacts and relays to socket 494a whenever a major total is to be taken, to a socket 495 whenever an intermediate total is to be taken, and to a socket 496 whenever a minor total is to be taken.

Furthermore, after the required number of totals are taken, a circuit is completed to each of these sockets 494a, 495, and 496 for the purpose of effecting reset on all the accumulators which were involved in the total taking operations. In Fig. 18 the contacts 546 as before are inserted in the total and reset circuits of the accumulators and the coil 544 is plugged through socket 545 to socket 496 whereupon the particular accumulator controlled by the relay 544–546 will take a total and reset whenever the machine performs a minor totaling operation. By plugging the coil 544 to the socket 495 the accumulator would take a total and reset whenever the machine performs an intermediate totaling operation and by plugging the coil to socket 494 similar results would be obtained for a major total. It will therefore be clear that every accumulator on the machine may be selected for major, intermediate or minor totals with consequent resetting or for total taking with or without reset on any totaling operation of the machine or for reset without totaling, thus giving universal flexibility to the totaling functions.

Zero print and suppression

The present invention involves a new method of zero printing and as usual zeros are printed under control of significant figures selected for printing in adjacent columns and not under record or accumulator control. These features are claimed in a divisional application, Ser. No. 520,600. It will be recalled that the type on the type bar passes printing position in the order 9, 8, 7, 6, 5, 4, 3, 2, 1, 0. A blank space or a blank type is provided between the 1 and the 0 type so that if zero printing is to be suppressed in any column the type bar must be arrested with this blank type opposite the printing line.

Referring to Figs. 5 and 5A it will be recalled that just after the type bar 229 passes the 1 printing position an arm 245 is released by bail 239. If the type bar has been arrested to select a significant figure this arm 245 is held by the extension of a type bar on which the ratchet teeth are formed but if the type bar has not been selected for significant figure printing it has at this time risen sufficiently to permit the arm 245 to rock, closing contacts 237. These contacts 237 control zero printing (see Fig. 16D). One contact of each pair 237 is connected to a socket 560. Opposite this socket is one 561 connected directly to main line 401. Another socket 562 is connected with the printer magnet for the adjacent column to the left. When a bank of printing type is to be formed socket 560 of the extreme left hand accumulator element is plugged to socket 561 while all other sockets 560 are plugged to sockets 562 as indicated by the dotted lines in the figure. Now if the type on the extreme left is selected for significant figure printing during any cycle, the contacts 237 in the thousands order remain open and no blank position selective circuit at all is established and all type which are not selected for significant figures rise to their highest position to position the zero type opposite the printing line. If this left hand type is not selected for significant figure printing its contacts 237 close just after the type passes the one printing position and the suppression circuit is established from main line 401, to sockets 561 and 560 and contacts 237 to printer magnet 233 of the thousands order, thus arresting the type bar in this order in the blank position so that there will be no printing. If the hundreds order likewise has not been selected for a significant figure printing, its contacts 237 close.

The circuit is then extended to sockets 562 and 560 of the hundreds order and through contacts 237 of the hundreds order to the hundreds print magnet 233, whereupon this type bar also is arrested in blank position. Now assuming that the tens type bar has been selected for a significant figure, its contacts 237 remain open. Consequently there will be no suppression circuit for the units order and this type bar will rise to its highest position, positioning its zero type opposite the printing line. Thus the suppression circuit is only closed through a printing magnet when no type bar to its left is selected for digit printing. The suppression circuit has a branch extending through the suppression contacts 237 of each of the lower orders but this branch circuit will be interrupted for all the remaining type bars by the selection of any bar for significant figure printing whereupon zeros will be printed to the right of the first significant figures in any column in which a significant figure does not occur.

Subtraction

As in the copending application of Bryce, Serial No. 119,803, now Patent No. 1,950,475, two accumulators are used for subtracting, one of which will indicate the true or tens balance if it is a positive one and the other of which will indicate the true balance if it is a negative one. These will be hereinafter identified as the positive and negative balance accumulators. The accumulators are wired so that the positive balance accumulator receives positive items in their true value and negative items in their complementary value. The negative balance accumulator receives true values of negative items and complementary values of positive items.

The positive and negative items are punched in the same card columns and any card bearing a negative item is provided with a designating perforation in the X position of a selected column, this perforation being omitted from positive item cards. As the upper brushes UB analyze the columns in question they read the items into a translator which converts them into their tens complementary values and emits the proper impulses during the following card cycle when the card is passing the lower brushes. The true values are read by the lower brushes. A switching arrangement, under control of the brush cooperating with the column in which the designating X perforation occurs, provides for connecting the positive balance accumulator to the lower brushes LB and the negative balance accumulator to the translator to receive complements for positive items while the connections are shifted on passage of a card having the designating perforations in the X position representing a negative item so that the positive balance accumulator receives the complement and the negative balance accumulator receives the true value.

The mechanism through which the complements are obtained from the upper brush has already been explained in its mechanical and electrical features in connection with Figs. 13, 14 and 15. The circuits which enter into subtraction have been separated from the main circuit diagram and assembled in Fig. 19. The automatic switch for entering the true and complementary values of items in their proper accumulators comprises a set of relays 570 of which only one is shown in Fig. 19. These are in circuit with a pair of cam contacts F—11 which are arranged to close instantaneously when the analyzing brushes are searching the X position on records.

The contacts F—11 are connected with a socket 572 which should be plugged to the upper brush cooperating with the column selected to receive a designating perforation in its X position for representing a negative item. When so plugged any positive card on passing the upper brushes will not energize the relay coil 570 while any negative card bearing the designating perforation will energize this relay. Incidentally the holding relay 573 in parallel with the relay 570 is energized closing its contacts 574. This provides a stick circuit for the relays 570 and 573 extending from line 400, to cam contacts F—10, contacts 574 of relay coil 573 and relay coil 570 to the other line 401. Cam contacts F—10 are normally closed but open for a brief interval just prior to the analysis of the X position by the analyzing brushes. Thus when the relay 570 is once energized it remains energized during the complete adding portion of the following card cycle and is thereafter deenergized prior to the analysis of the X position on the following card. The relay 570 controls two groups of contacts 574 and 575. Each group consists of three contacts of which the middle contact is shiftable by the relay coils but assumes the position shown in the drawings when the coils are deenergized and is shifted on energization of the coil to engage the upper coacting contact instead of the lower one. Similar groups of contacts 576 are operated in an identical manner by the relay coil 573 (see Figs. 16C and 16A). The middle shiftable contacts of groups 574 are connected to the reading-out commutators 282 of the translating devices which in turn are connected directly to the line 401. The lower contact of each pair terminates in a socket 577 and the upper contact terminates in a socket 578.

The middle shiftable contacts of groups 575 are connected to the middle contacts of groups 576 (see Fig. 16C) and terminate in sockets 579 while the upper and lower contacts of groups 575 are connected respectively to the lower and upper contacts of groups 574. The upper and lower contacts of groups 576 terminate in sockets 582 and 583 respectively.

The reading-in commutators 280 are connected to line 401 through relay contacts 584 which are controlled by relay coil 412 (see Fig. 16A) in series with the upper key brush UKB holding relay 411. Contacts 584 are normally closed but owing to the operation of the key brush circuit will be opened whenever the card feed is in operation and cards are not actually under the upper brushes. The translators then can only operate when a card is feeding past the upper brushes to effect a reading into them. The magnets 290 (Fig. 16C) are controlled by the commutators 280 to shift brushes 293 of the reading-out commutators 282 to effect a set up corresponding to the complement of the data on the card passing the upper brushes so that the impulses emitted from the commutators 282 during the next card cycle will be representative of the complementary data. The magnets 290 are connected to sockets 285. The reading-out commutators 282, as in the application of Bryce, Serial No. 222,467 now Patent No. 1,791,953, are arranged so that the translator in the units order complements to ten while the translators in the higher orders complement to nine, thus giving the true or tens complement for each entry. Of course more than one units order translator may be provided so that the machine can handle several balances concurrently. The timing of the machine is such that the entry of ten units is possible so that the units wheel, if necessary, may turn ten complete points to receive ten in cases where the value represented on the card is zero in the units order.

For a subtracting operation the upper brushes cooperating with the columns in which the subtractive items occur are plugged to sockets 285 (Fig. 19) to read into the commutators 280. The corresponding lower brushes LB are plugged into sockets 579 so that their impulses are transmitted by the contact 574 and 575. The accumulator magnets 206 of the accumulators selected for negative balances are plugged to the sockets 577 while the accumulator magnets of the accumulator selected for the positive balance are plugged to the sockets 578. When a positive card passes the lower brushes it has no effect on the contacts 574 and 575 which therefore remain as shown in the drawings. The impulses from the lower brushes from this positive card are entered into the positive accumulator through a circuit extending from socket 579 to middle contacts of groups 575, thence through cooperating lower contacts of these groups to socket 578 which is connected to the positive balance accumulator. This card on passing the upper brushes of course has set the translator brushes 293 to provide for emitting impulses corresponding to its complement during this cycle and these complementary impulses are transmitted to the negative balance accumulator through a circuit extending from line 401, through commutators 282, middle contacts of groups 574 and through lower cooperating contacts to sockets 577 connected to the negative balance accumulator. If the card in question bears a negative item as evidenced by the presence of a perforation in the X position in the selected column, the relay 570 will be energized during this entering cycle as previously explained thus shifting the middle contacts of groups 574 and 575 out of engagement with the lower contacts of the group and into engagement with the upper contacts.

In this case the direct impulses from the lower brushes are entered into the negative accumulator, the circuit extending from socket 579 to middle contacts of groups 575 thence through upper contacts of these groups to sockets 577 connected to the negative balance accumulator. The complementary impulses from commutators 282 are conducted through middle contacts of groups 574 and upper contacts of these groups to sockets 578 connected to the positive balance accumulator. This provides for entering positive items in their true value into the positive accumulator and in their negative values into the negative accumulator and vice versa for the negative items.

The groups of contacts 576 (Fig. 16C) are known as the class selecting contacts and are not directly concerned with subtraction. It will be noted that these contacts connect sockets 579 to sockets 583 on the passage of any card without a designating perforation in the X position and connect sockets 579 to sockets 582 on the passage of any card with such a perforation. By plugging the lower brushes to sockets 579 and sockets 582, 583 respectively to different accumulators, one accumulator will receive a summation of all items from cards bearing the X perforation and the other will receive a summation of all items from cards not bearing such a perforation. In the present case positive and negative items could be so classified into separate accumulators.

At the end of a card run one of the balance accumulators indicates a true balance while the other indicates a complement of it. If the true balance is a positive one it occurs on the positive accumulator and if it is a negative one it occurs on the negative accumulator.

During total printing operations the accumulators should be selected for total printing according to whether they contain a true or complementary balance, as it is desirable to print only the true balance whether positive or negative. The presence of a complementary balance on an accumulator is evidenced by the occurrence of nines on all accumulator wheels to the left of the first significant figure and it is customary to feel out the extreme left hand wheel for this nine to select the proper accumulator for balance printing. As in the case of class selection of totals the positive balance accumulator is plugged to include the contacts 546 of one of a multi-contact relay 544 in its total circuit and the negative balance accumulator is plugged to include the contacts 546 of another of the multi-contact relays 544. The coil 544A controlling positive totals is plugged from its socket 545 to a socket 590 while the coil 544B governing the negative accumulator totaling circuits is plugged to a socket 591. The sockets 590 and 591 are alternatively connected to the line 400 during totaling operations by shiftable relay contacts 592 controlled by relay coil 593. Normally the contacts 592 connect the socket 590 to the line 400 so that the normal condition provides for printing from the positive balance accumulator and is only shifted when this accumulator contains a nine on its extreme left hand wheel indicating the presence of a complementary balance thereon. The presence of this nine is felt out through the nine transfer contacts 220 (Fig. 16D) which for this purpose are plugged between sockets 594 and 595 shown in the lower part of Fig. 16A. The sockets 594 and 595 are in series with cam contacts T—5, a holding coil 596 and balance selecting relay coil 593. This circuit also includes cam contacts T—30 normally closed but which open instantaneously at the end of each totaling operation.

The cam contacts T—5 close instantaneously at the beginning of a total taking operation. If the left hand wheel of the positive balance accumulator does not contain a nine its contacts 220 will not be bridged by the segment of the transfer commutator and the balance selecting circuit is not effected whereupon the true balance is printed from the positive accumulator during the total taking operation. The presence of a nine on the extreme left hand wheel, meaning that the positive accumulator contains a complementary balance and that the true balance is on the negative accumulator, causes briding of the nine contacts 220 whereupon closure of cam contacts T—5 completes the circuit from line 401 to socket 595 and through transfer contacts 220 to socket 594 thence through cam contacts T—5, holding coil 596 and balance selecting coil 593 and cam contacts T—30 to the other line 400. Relay 596 closes contacts 597 establishing a holding circuit for the balance selecting relay 593 which persists through the total taking operation and is interrupted at the end of it by the opening of cam contacts T—30. The energization of coil 593 shifts the contacts 592 so that line 400 is connected to socket 591 and thence through the multi-contact relay coil 544B controlling the negative balance accumulator to the other line 401. This operating circuit includes the cam contacts T—6 which are normally open but close during the entire operating portion of the totaling cycle. In this case, of course, the contacts 546 in the total circuit of the negative balance accumulator are closed and the true balance is printed from this negative accumulator.

Regardless of which accumulator contains the true balance and thus controls the balance printing both the positive and negative accumulators should be reset. For this reason resetting cam contacts are inserted in the circuits connected to both sockets 590 and 591, contacts R—9 being in circuit with sockets 590 and R—10 in circuit with sockets 591. During resetting operations the cam contacts R—9 and R—10 close to energize the relays 544 governing both the positive and negative accumulators so that both accumulators will be reset when the machine performs a resetting operation following total taking.

*Summary*

The complete operation of the machine when set for nonlisting operation with automatic total and reset will be briefly summarized. Assume that cards have just been placed in the magazine and that switches 437, 443 and 445 are closed and switches 447 and 403 are open. The machine is started by depressing start key ST (Fig. 16) and holding it down until the first card reaches the lower brushes when lower key brush contacts LKB #1 close and maintains the circuit of the card feed clutch magnet 406. The group indication number may be printed from the first card which passes the lower brushes during the third cycle. As previously explained toward the end of the second cycle the print clutch magnet is called into operation by concurrent closure of contacts F—5, UKB #1 and GI—1 and is maintained in operation during the third cycle by cam contacts F—6. When F—6 opens in the third cycle the print clutch magnet is deenergized and remains deenergized as contacts GI—1 have now opened. Card feed continues, permitting adding from the several cards until the card group changes whereupon the automatic control system opens contacts 435 and deenergizes the card feed clutch magnet, interrupting card feed.

Total taking is instituted by closure of contacts 442, also due to operation of the automatic control system, during the late part of the last adding cycle when contact F—2 also closes. This energizes the total clutch magnet 432, its circuit being maintained until contacts 442 again open which owing to the operation of the automatic control circuit occurs when total taking is finished.

The print clutch magnet 434 is also called into operation during totaling by the operation of the automatic control system which closes contacts 452 during total taking. These contacts open when total taking is finished but contacts F—6 maintain the energization of the print clutch magnet until the end of the next adding cycle when group indications are printed for the following card group.

The resetting operation is delayed until the end of total taking by contacts 446 which are opened by the automatic control system and held open until the late portion of the last total taking cycle. At this time contacts T—3 close and energize the reset clutch magnet 433 instituting the reset operation. The circuit of the reset clutch magnet 433 is held through contacts 444 and R—4 for a single cycle during which all resetting operations are accomplished. The resetting also sets up the GI contacts for a single cycle and GI—2 shunt the resistance in the shunt field of motor M to make this first cycle a low speed one. The circuit of the print clutch magnet has been held from the total taking operation so that group designation numbers from the first card of the following group may be printed.

At the end of reset contacts R—1 close temporarily and energize the card feed clutch magnet to effect card feed which continues until the automatic control system again institutes the total taking and resetting operations at the end of the group.

What is claimed is:

1. A record controlled accounting machine having an automatic group control system divisible into ranked sections, an accumulator associated with each section, total taking means controlled by the system for normally taking totals successively from all accumulators associated with sections of lower rank and the accumulator associated with the section in which a group change occurs and means for limiting the number of operations of the total taking means to that actually required by the operation of the control system, reset mechanism and means controlled by the total taking mechanism for calling the same into operation to reset simultaneously all accumulators from which totals have been taken.

2. In an accounting machine, an accumulating circuit and a printing circuit insulated from each other, an electrical entry control device, a socket in said accumulating circuit and a socket in said printing circuit to permit of independent plugging of said circuits to said entry control device and a split socket having a portion connected to each of said first named sockets to permit plugging of both circuits to the entry control device by a single plugging operation.

3. In a machine of the class described, a plurality of denominational order accumulating wheels, a pair of transfer contacts, one for each wheel, closed by the related wheels when in the nine position, transferring circuit connections for controlling the transfer of a unit from any order wheel to a higher order wheel, balance selecting devices, means for controlling the operation of said devices, and means for selectively causing any of said pairs of contacts to either control the operation of said controlling means or to cooperate with said circuit connections to extend a transfer operation.

4. In a machine of the class described, a plurality of denominational order accumulating wheels, transfer controlling instrumentalities, total print controlling instrumentalities, a plurality of like means, one for each wheel, rendered effective by the wheel when in nine position and each capable of cooperating with said transfer controlling instrumentalities or controlling the operation of said total print controlling instrumentalities, and means for causing any of said plurality of means to cooperate with or control the operation of either of said instrumentalities.

5. In a machine of the class described, a plurality of denominational order accumulating wheels, transfer controlling instrumentalities, total print controlling instrumentalities, a plurality of like means, one for each wheel, rendered effective by the wheel when in nine position and each capable of cooperating with said transfer controlling instrumentalities or controlling the operation of said total print controlling instrumentalities, means for causing any of said plurality of means to control the operation of said total print controlling instrumentalities and means for causing the others of said plurality of means associated with wheels of lower denominational order to cooperate with said transfer controlling instrumentalities.

JAMES W. BRYCE.
GEORGE F. DALY.